United States Patent
Rao et al.

(10) Patent No.: US 11,283,913 B1
(45) Date of Patent: Mar. 22, 2022

(54) VOICE-ENABLED COMMUNICATION CONFIGURATIONS

(71) Applicant: Amazon Technologies, Inc., Seattle, WA (US)

(72) Inventors: Shambhavi Sathyanarayana Rao, Seattle, WA (US); Manish Degan, Seattle, WA (US); Sachin Goel, Bothell, WA (US); Benjamin Ryan Snellings, Seattle, WA (US); Fuxing Liu, Seattle, WA (US); Yahia Chafik Chehadeh, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/883,609

(22) Filed: May 26, 2020

Related U.S. Application Data

(63) Continuation of application No. 16/214,564, filed on Dec. 10, 2018, now Pat. No. 10,674,001.

(51) Int. Cl.
| | |
|---|---|
| *H04B 1/38* | (2015.01) |
| *H04M 1/72409* | (2021.01) |
| *H04M 1/60* | (2006.01) |
| *G10L 15/22* | (2006.01) |
| *H04M 1/72484* | (2021.01) |

(52) U.S. Cl.
CPC ......... *H04M 1/72409* (2021.01); *G10L 15/22* (2013.01); *H04M 1/6033* (2013.01); *H04M 1/72484* (2021.01); *G10L 2015/223* (2013.01)

(58) Field of Classification Search
CPC . H04W 88/02; H04M 1/271; H04M 1/72519; H04M 1/57; H04M 19/04; H04M 19/041; H04M 19/047
USPC ........................................ 455/557, 563, 567
See application file for complete search history.

(56) References Cited

U.S. PATENT DOCUMENTS

| | | |
|---|---|---|
| 10,192,553 B1 | 1/2019 | Chenier et al. |
| 2016/0259656 A1 | 9/2016 | Sumner et al. |
| 2016/0366084 A1 | 12/2016 | Malahy |
| 2018/0182389 A1 | 6/2018 | Devaraj et al. |
| 2018/0248989 A1* | 8/2018 | Kashimba ......... H04M 3/42034 |

OTHER PUBLICATIONS

Non Final Office Action dated Oct. 4, 2019 for U.S. Appl. No. 16/214,564 "Voice-Enabled Communication Configurations" Rao, 5 pages.

* cited by examiner

*Primary Examiner* — Temica M Beamer
(74) *Attorney, Agent, or Firm* — Lee & Hayes, P.C.

(57) ABSTRACT

Systems and methods for voice-enabled configurations for audio-output devices are disclosed. User accounts may be associated with one or more voice-enabled devices. Those voice-enabled devices may include audio-output functionality, while other voice-enabled devices do not include audio-output functionality. For devices without audio-output functionality, sending and/or receiving calls and/or messages may depend on whether the device is connected to an auxiliary device with audio-output functionality, via wired and/or wireless connection. Notifications of whether calling and/or messaging is enabled may be sent to the sending and/or receiving devices.

20 Claims, 16 Drawing Sheets

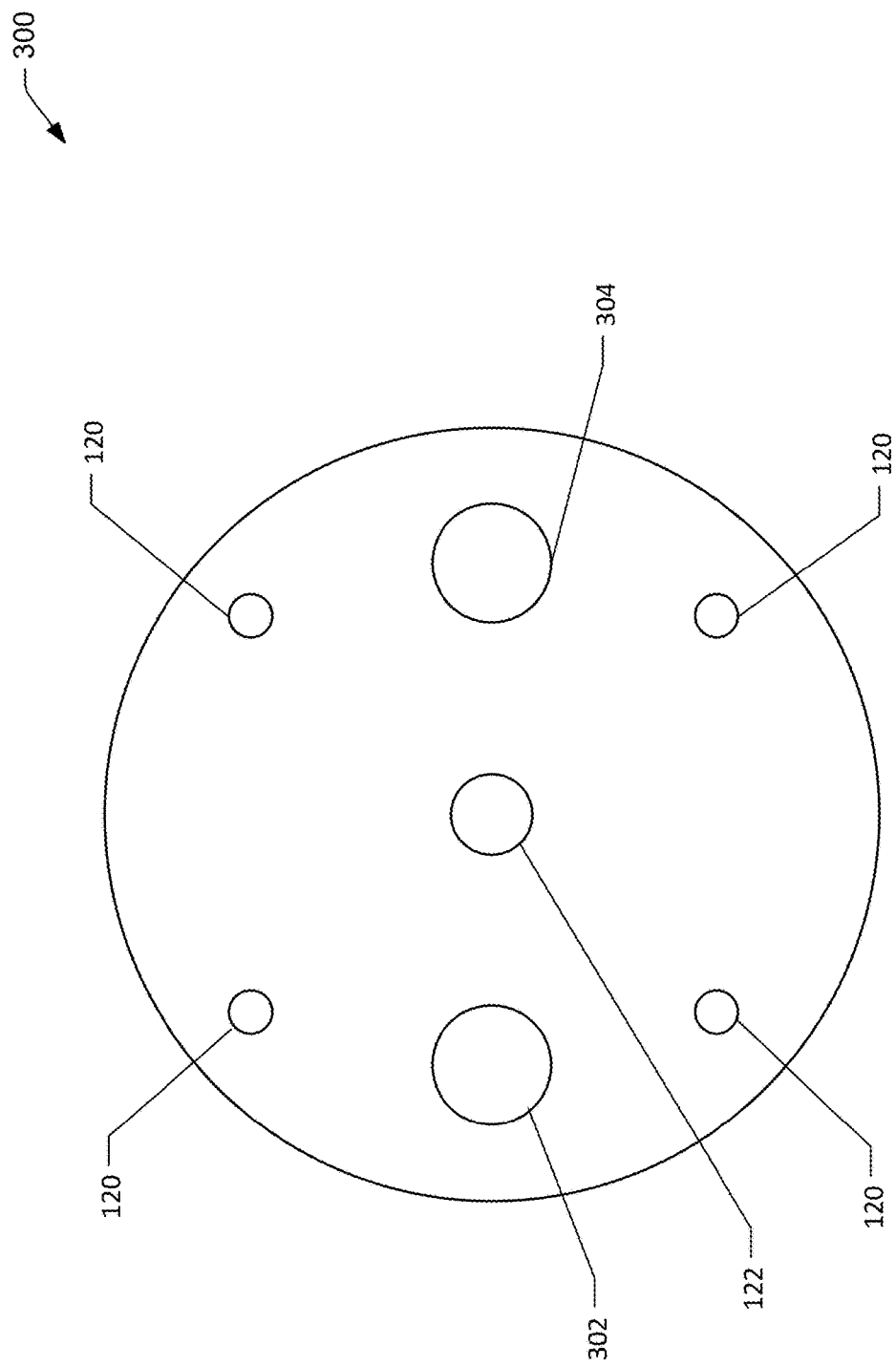

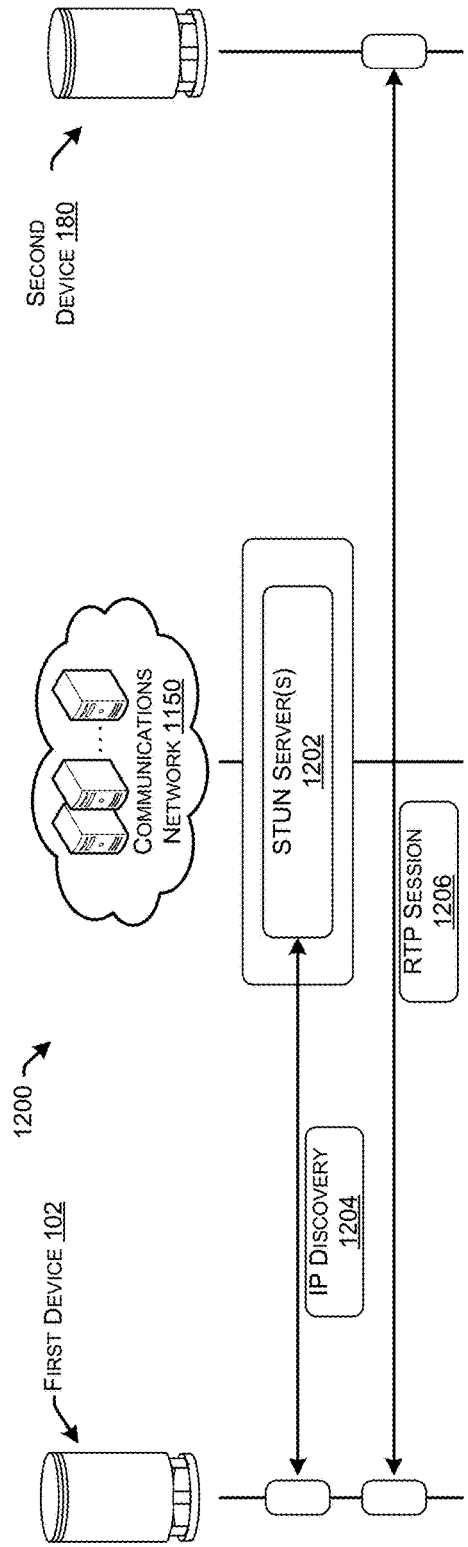
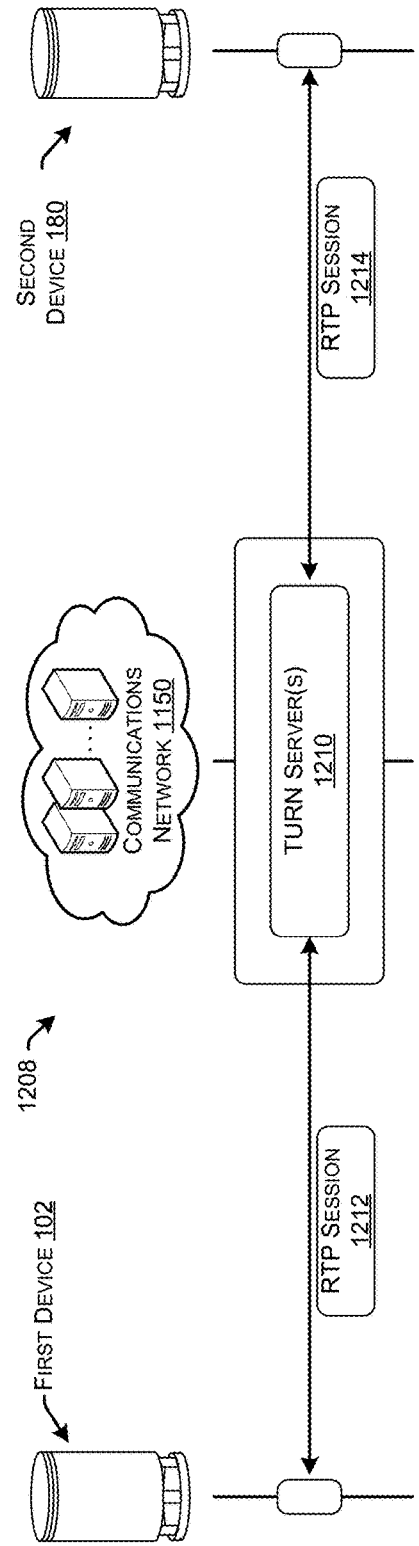

VOICE-ENABLED COMMUNICATION CONFIGURATIONS

RELATED APPLICATIONS

This application claims priority to and is a continuation of U.S. patent application Ser. No. 16/214,564, filed on Dec. 10, 2018, the entire contents of which are incorporated herein by reference.

BACKGROUND

Voice-enabled devices have become ubiquitous. Users of voice-enabled devices may desire to communicate using such devices. Described herein are improvements in technology and solutions to technical problems that can be used to, among other things, improve the use of voice-enabled devices to communicate with other devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates example components of a voice-enabled device.

FIGS. 12A and 12B illustrate example components for a communications system to establish a flow of data between devices.

DETAILED DESCRIPTION

Figure 1:
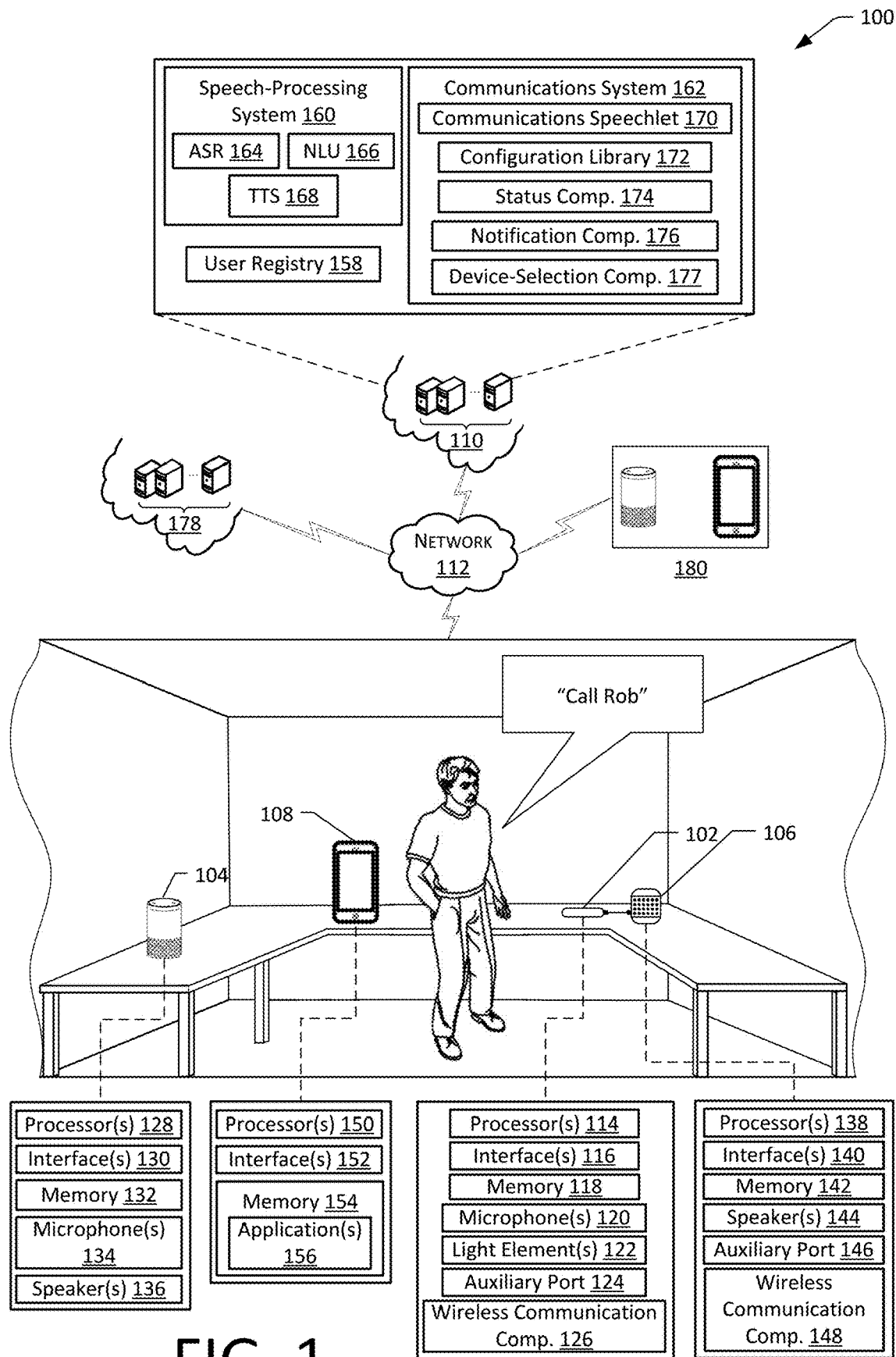
FIG. 1 illustrates a schematic diagram of an example environment for voice-enabled communication configurations.

Systems and methods for voice-enabled communication configurations are disclosed. Take, for example, an environment or space such as a home that may have one or more voice-enabled devices. The voice-enabled devices may be configured, for example, to receive audio representing user utterances and generate corresponding audio data to be utilized by a remote system, for example, to cause an action and/or operation to be performed. Some of the voice-enabled devices may include a speaker and/or other audio-output functionality. Other voice-enabled devices may not include a speaker or other audio-output transducer, but instead may include components and/or functionality that allows for wireless and/or wired connection to an auxiliary device that does include a speaker or other an audio-output transducer.

For example, a given voice-enabled device without audio-output transducer may be configured to pair or otherwise wirelessly connect, such as via Bluetooth, with a "smart speaker" auxiliary device. In these examples, audio data may be received by the voice-enabled device, which may wirelessly send the audio data to the auxiliary device. The example voice-enabled device may also include an auxiliary port, which may also be described as a socket or female electrical contact, that may be configured to receive a portion of an auxiliary cable, such as a plug or male electrical contact. One end of the auxiliary cable may be physically plugged into the auxiliary port of the voice-enabled device while the other end of the auxiliary cable may be physically plugged into an auxiliary port of an auxiliary device, such as a smart speaker. By so doing, the example voice-enabled device may communicate with the auxiliary device to output audio via the auxiliary device.

The present innovations relate to voice-enabled communication configurations depending on, for example, the type and/or capabilities of voice-enabled device, and/or whether a voice-enabled device without a speaker is connected to an auxiliary device via wired and/or wireless connection. For example, a remote system associated with a given voice-enabled device may receive a request to establish a communication channel, such as a call, between a remote device and at least one voice-enabled device associated with a user account. The remote system may identify voice-enabled devices associated with the user account and may identify and/or determine the capabilities and/or types of the voice-enabled devices. For example, the remote system may determine that a first voice-enabled device is of a first type that does not include a speaker or an audio-output transducer, such as a speaker, while a second voice-enabled device is of a second type that does include a speaker or an audio-output transducer. Based at least in part on determining that the first voice-enabled device is of the first type, the remote system may determine whether one or more prerequisites are associated with establishing a communication channel with the first voice-enabled device. In examples, the prerequisites may include determining whether calling is enabled on the first voice-enabled device, whether the first voice-enabled device is wirelessly connected to an auxiliary device with a speaker or an audio-output transducer, and/or whether the auxiliary device is connected to the first voice-enabled device via a wired connection.

The remote system may send request data to the first voice-enabled device representing a query to determine whether one or more of the prerequisites have been met and/or otherwise to acquire a status of the first voice-enabled device. The first voice-enabled device, based at least in part on receiving the request data, may identify, determine, and/or generate status data indicating a current status of the first voice-enabled device. For example, the status data may indicate that calling is enabled for the first voice-enabled device and that an auxiliary device is connected to the first voice-enabled device via wired connection. In this example, the remote system may receive the status data from the first voice-enabled device and, based at least in part on determining that calling is enabled and/or that the auxiliary device is connected to the first voice-enabled device via wired connection, may send notification data to the first voice-enabled device indicating that a call is incoming. In examples, the notification data may cause a light element of the first voice-enabled device to emit a light indicating there is an incoming call. Additionally, or alternatively, the notification data may cause the auxiliary device to output audio representing a notification that a call is incoming. The user may provide an indication that the call should be answered, and the remote system and/or a third-party system representing a communication network may establish the communication channel between the first voice-enabled device and a sending device that initiated the call.

In other examples, the status data received from the first voice-enabled device may indicate that an auxiliary device is wirelessly connected to the first voice-enabled device, but the auxiliary device is not connected to the first voice-enabled device via wired connection. In these examples, the remote system may determine that the first voice-enabled device should not receive the notification of an incoming call. For example, while a communication channel may be established between the first voice-enabled device and the sending device that initiated the call, in situations where an auxiliary device is wirelessly connected, doing so may result in a call with less desirable and/or reliable audio for the sending and/or the receiving devices. As such, the remote system may determine that calling may be enabled for the first voice-enabled device when the auxiliary device is connected via a wired connection, but not when wirelessly connected. In these examples, given that the auxiliary device is wirelessly connected to the first voice-enabled device, the remote system may send audio data to the first voice-enabled device, which may send the audio data to the auxiliary device to output corresponding audio. The audio may represent a notification that the first voice-enabled device is not connected to the auxiliary device via wired connection and/or to enable calling on the first voice-enabled device, the auxiliary device should be physically plugged into the first voice-enabled device. Additionally, or alternatively, an alert may be sent from the remote system to a mobile device associated with the user account. The alert may provide an indication that the first voice-enabled device is not connected to the auxiliary device via wired connection and/or to enable calling on the first voice-enabled device, the auxiliary device should be physically plugged into the first voice-enabled device.

In the examples provided above for inbound calling, the first voice-enabled device may receive a notification of an incoming call when the first voice-enabled device is connected to the auxiliary device via wired connection. Other voice-enabled devices, such as a second voice-enabled device of the second type having a speaker or an audio-output transducer, may receive the notification. In this way, only voice-enabled devices that have been determined by the remote system to be enabled for calling and that have a speaker or an audio-output transducer and/or be connected to an auxiliary device via wired connection may receive the notification of the incoming call.

By way of further example, the remote system may receive request data to send a message to one or more devices associated with the user account. The message may include audio data from a user of a sending device and/or audio data generated from text data provided by a user of the sending device. In these examples, the remote system may determine the device type and/or device functionalities of the first voice-enabled device, as described above. Based at least in part on determining that the first voice-enabled device is of the first type, the remote system may determine whether one or more prerequisites are associated with sending message data to the first voice-enabled device. In examples, the prerequisites may include determining whether messaging is enabled on the first voice-enabled device, whether the first voice-enabled device is wirelessly connected to an auxiliary device with a speaker or an audio-output transducer, and/or whether the auxiliary device is connected to the first voice-enabled device via a wired connection.

Status data indicating whether the one or more prerequisites are met may be sent from the first voice-enabled device to the remote system. In examples, the status data may indicate that messaging is enabled and that the first voice-enabled device is connected to the auxiliary device via wired connection and/or wirelessly. In these examples, a notification that a message has been received may be sent to the first voice-enabled device. Upon receiving input from the user to output the message, the remote system may send audio data representing the message to the first voice-enabled device, which may cause the auxiliary device to output audio corresponding to the audio data.

In other examples, the status data may indicate that messaging is enabled but that the first voice-enabled device is not connected to the auxiliary device via wired connection or wirelessly. In these examples, a speaker and/or an audio-output transducer is absent from the first voice-enabled device and thus audio cannot be output from the first-voice-enabled device. Based at least in part on this status data, the remote system may determine that messaging is not available for the first voice-enabled device and may not send a notification that a message has been received to the first voice-enabled device. The remote system may send an alert to the mobile device indicating that messaging is unavailable for the first voice-enabled device and/or instructions for enabling messaging. Other voice-enabled devices associated with the user account that have a speaker or an audio-output transducer and/or that are connected to an auxiliary device may receive the notification that the message has been received.

Additionally, or alternatively, for outbound calling where the first voice-enabled device is attempting to initiate a call with one or more recipient devices, microphones of the first voice-enabled device may receive audio representing a user utterance and may generate corresponding audio data. The audio data may be sent to the remote system for speech processing, which may include determining intent data indicating that the user utterance includes a request to establish a communication channel between the first voice-enabled device and one or more devices associated with a given user account. In these examples, the remote system may determine whether the first voice-enabled device is of a type that includes a speaker or an audio-output transducer. If the first voice-enabled device includes a speaker or an audio-output transducer, a request to establish the communication channel may be sent to a third-party system associated with a communication network and/or to the recipient device.

If the first voice-enabled device does not include a speaker or an audio-output transducer, the remote system may identify one or more prerequisites, similar to those described above for calling functionality. The remote system may send request data to the first voice-enabled device to determine whether the prerequisites have been met. Status data may be received from the first voice-enabled device indicating, in examples, that calling is enabled and that the voice-enabled device is connected to the auxiliary device via wired connection. In these examples, the remote system may determine that the prerequisites for initiating a call have been met and may send a request to establish a communication channel to the third-party system associated with the communication network and/or to the receiving device. In other examples, the status data may indicate that calling is enabled and that the first voice-enabled device is wirelessly connected to the auxiliary device, but that the first voice-enabled device is not connected to the auxiliary device via wired connection. In these examples, the remote system may determine that the prerequisites for initiating a call have not been met, and, for example, may notify the user that the call cannot be placed.

Additionally, or alternatively, for outbound messaging. The remote system may identify one or more prerequisites similar to those described above for messaging functionality, and may send request data to the first voice-enabled device to determine whether the prerequisites have been met. Status data may be received from the first voice-enabled device indicating, in examples, that messaging is enabled and that the first voice-enabled device is connected to the auxiliary device via wired and/or wireless connection. In these examples, the remote system may determine that the prerequisites for sending a message have been met and may send a request to send the message to the third-party system associated with the communication network and/or to the receiving device. In other examples, the status data may indicate that messaging is enabled and that the first voice-enabled device is not connected to the auxiliary device via wired or wireless connection. In these examples, the remote system may determine that the prerequisites for sending a message have not been met, and, for example, may notify the user that the message cannot be sent.

Additionally, or alternatively, the remote system may determine that an auxiliary device has been disconnected from the voice-enabled device and/or that the auxiliary device has been disabled and/or has "fallen asleep," and may terminate a communication channel based at least in part on this determination. For example, during a communication channel, users of the devices that are part of the communication channel may depend on receiving audio to determine whether a call is in progress and/or whether a call has ended. As such, if an auxiliary device becomes disconnected and/or otherwise is disabled during a call, one or more of the users may not know that the communication channel is still established and that audio data is still being transmitted. In these and other examples, the remote system may determine when the auxiliary device is unplugged from the voice-enabled device and/or when the auxiliary device is disabled, powered off, and/or enters into a "sleep mode" where the device is still on but is not outputting audio even when audio data is being received.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for voice-enabled communication configurations. The system 100 may include, for example, a first voice-enabled device 102 and a second voice-enabled device 104. The first voice-enabled device 102 and the second voice-enabled device 104 may be configured to receive user utterances and perform operations in response to such user utterances. In these examples, the voice-enabled devices 102, 104 may be "hands free" such that interactions with the device are performed through audible requests and responses.

The system 100 may also include one or more auxiliary devices 106. The auxiliary devices 106 may be described as "smart" devices, which may have certain computing components and be configured to send and/or receive data from other devices. Particularly, the auxiliary devices 106 may be configured to receive audio data from the voice-enabled devices 102, 104 and to output corresponding audio via one or more speakers. The auxiliary devices 106 may be "paired" or otherwise associated with the voice-enabled devices 102, 104. As such, the auxiliary devices 106 may be configured to send data to and/or receive data from the voice-enabled devices 102, 104. Additionally, the auxiliary devices 106 may include an auxiliary port and/or other connection means to connect to the voice-enabled devices 102, 104. As such, the auxiliary devices 106 may connect to the voice-enabled devices 102, 104 via wired and/or wireless connection.

The system 100 may also include one or more mobile devices 108. The mobile devices 108 may be associated with the voice-enabled devices 102, 104 and/or the auxiliary devices 106. The mobile devices 108 may have certain computing components and be configured to send and/or receive data from the other devices. In examples, the mobile devices 108 may include "smart phones," telephones, tablets, laptops, watches, and/or other computing devices.

The voice-enabled devices 102, 104 and/or the accessory devices 106 and/or the mobile devices 108 may be configured to send data to and/or receive data from a remote system 110, such as via a network 112. In examples, the voice-enabled devices 102, 104 and/or the accessory devices 106 and/or the mobile devices 108 may communicate directly with the remote system 110, via the network 112.

The first voice-enabled device 102 may include one or more components, such as, for example, one or more processors 114, one or more network interfaces 116, memory 118, one or more microphones 120, one or more light elements 122, an auxiliary port 124, and/or a wireless communication component 126. In examples, the first voice-enabled device 102 may be a device with far-field input such that the device may be activated and/or controlled using voice input as opposed to tactile input from physical controls. The microphones 120 may be configured to capture audio, such as user utterances, and generate corresponding audio data. The light elements 122 may be configured to emit light such as in response to the first voice-enabled device 102 receiving lighting data from the remote system 110 and/or one or more of the other devices. The light elements 112 may include, for example, light emitting diodes such that one or more colors and/or one or more light intensities may be emitted. The auxiliary port 124 may also be described as a socket or female electrical contact, which may be configured to receive a portion of an auxiliary cable, such as a plug or male electrical contact. One end of the auxiliary cable may be physically plugged into the auxiliary port 124 of the first voice-enabled device 102 while the other end of the auxiliary cable may be physically plugged into an auxiliary port of the auxiliary device 106. The wireless communication component 126 may be configured to send and/or receive data wirelessly between, for example, the first voice-enabled device 102 and the auxiliary device 106. The wireless communication component 126 may be utilized to pair and/or otherwise join the first voice-enabled device 102 to the auxiliary device 106. The devices may be paired utilizing one or more wireless technology standards such as via Bluetooth, Bluetooth Low Energy, and/or Wi-Fi, for example.

The second voice-enabled device 104 may include one or more components, such as, for example, one or more processors 128, one or more network interfaces 130, memory 132, one or more microphones 132, and/or one or more speakers 134. The microphones 134 may be configured to capture audio, such as user utterances, and generate corresponding audio data. The speakers 136 may be configured to output audio corresponding to audio data received at the second voice-enabled device 104 from for example, the remote system 110 and/or one or more of the other devices. In this way, the second voice-enabled device 104 may include audio-output functionality such as the speakers 136 while the first voice-enabled device 102 does not include a speaker or an audio-output transducer.

The auxiliary devices 106 may include one or more components, such as, for example, one or more processors 138, one or more network interfaces 140, memory 142, one or more speakers 144, an auxiliary port 146, and/or a wireless communication component 148. The speakers 144 may be configured to output audio corresponding to audio data received at the auxiliary device 106 from, for example, the first voice-enabled device 102. The auxiliary port 146 may include the same or similar components as the auxiliary port 124 described with respect to the first voice-enabled device 102. The wireless communication component 148 may include the same or similar components as the wireless communication component 126 described with respect to the first voice-enabled device 102.

The mobile device 108 may include one or more components, such as, for example, one or more processors 150, one or more network interfaces 152, and/or memory 154. The memory 154 may include one or more components such as, for example, one or more applications 156 residing on the memory 154 and/or accessible to the mobile device 108. The applications(s) 156 may be configured to cause the processor (s) 150 to receive information associated with interactions with the voice-enabled devices 102, 104 and cause display of representations, such as text and/or images, associated with the interactions. The application(s) 156 may also be utilized, in examples, to receive input data, such as from a user of the mobile device 108, and send the input data and/or instructions associated with the input data to the remote system 110. The application(s) 156 may also be utilized to display notifications and/or alerts received, for example, from the remote system 110.

The remote system 110 may include components such as, for example, a user registry 158, a speech-processing system 160, and/or a communications system 162. The speech-processing system 160 may include an automatic speech recognition (ASR) component 164, a natural language understanding (NLU) component 166, and/or a text-to-speech (TTS) component 168. The communications system 162 may include a communications speechlet 170, a configuration library 172, a status component 174, a notification component 176, and/or a device-selection component 177. Each of the components described herein with respect to the remote system 110 may be associated with their own systems, which collectively may be referred to herein as the remote system 110, and/or some or all of the components may be associated with a single system. The components of the remote system 110 are described in detail below. In examples, some or each of the components of the remote system 110 may include their own processor(s), network interface(s), and/or memory. As such, by way of example, the speech-processing system 160 may include and/or be associated with processor(s), network interface(s), and/or memory. The communications system 162 may include and/or be associated with different processor(s), network interface(s), and/or memory, or one or more of these components may utilize some or all of the same processor(s), network interface(s), and/or memory utilized by the speech-processing system 160. These components are described in detail below. Additionally, the operations and/or functionalities associated with and/or described with respect to the components of the remote system 110 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 158 may be configured to identify, determine, and/or generate associations between users, user accounts, and/or devices. For example, one or more associations between user accounts may be identified, determined, and/or generated by the user registry 158. The user registry 158 may additionally store information indicating one or more applications and/or resources accessible to and/or enabled for a given user account. Additionally, the user registry 158 may include information indicating device identifiers, such as naming identifiers, associated with a given user account, as well as device types associated with the device identifiers. The user registry 158 may also include information indicating user account identifiers, naming indicators of devices associated with user accounts, and/or associations between devices, such as the voice-enabled devices 102, 104 and the auxiliary devices 106. The user registry 158 may also include information associated with usage of the voice-enabled devices 102, 104 and/or the auxiliary devices 106. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 160 may be configured to receive audio data from the voice-enabled devices 102, 104 and perform speech-processing operations. For example, the ASR component 164 may be configured to generate text data corresponding to the audio data, and the NLU component 166 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "Call Rob," the NLU component 166 may identify a "call" intent and the payload may be "Rob." In this example where the intent data indicates an intent to establish a communication channel with a device associated with a user account having the identifier of "Rob," the speech-processing system 160 may call one or more speechlets to effectuate the intent. For example, the communications speechlet 170 associated with the communications system 162 may be called when the intent indicates that a call is to be established. The speechlet 170 may be designated as being configured to handle the intent of initiating communication channels and/or accepting requests to establish communication channels, for example. The speechlet 170 may receive the intent data and/or other data associated with the user utterance from the NLU component 166, such as by an orchestrator of the remote system 110, and may perform operations to instruct the voice-enabled devices 102, 104 and/or another device to perform an operation.

The speechlet(s) described herein may include a speech-enabled web component that may run in the remote system 110. Speechlet(s) may receive and respond to speech-initiated requests. Speechlet(s) may define life-cycle events for an application as experienced by a user, a way to process speech requests from the user, and/or call-backs from events happening on the device the user is interacting with. Given speechlet(s) may be capable of handling certain intents. For example, the NLU component may generate intent data that indicates an intent as well as a payload associated with the intent. A speechlet may be associated with the intent, and thus the intent data, including the payload may be sent to and received by the speechlet. The speechlet may process that intent by analyzing the payload and generating data representing a directive and/or instruction to perform an action. The directive and/or instruction may be sent to other components of the system for performance of the action.

The configuration library 172 may be configured to store data indicating one or more features and/or aspects associated with the voice-enabled devices 102, 104. For example, the configuration library 172 may store data indicating that a particular voice-enabled device 102 does not include a speaker or an audio-output transducer while another voice-enabled device 104 does include a speaker or an audio-output transducer. The configuration library 172 may also store data indicating that, for given operations such as calling and/or messaging, one or more prerequisites are to be satisfied to enable certain functionalities. For example, the prerequisites may include a voice-enabled device 102 being wirelessly connected to the auxiliary device 106 and/or the voice-enabled device 102 being connected to the auxiliary device 106 via wired connection. The data stored with respect to the configuration library 170 may be described herein as configuration data. Upon receiving the intent data from the speech-processing system 160, including an identifier of the device from which the audio data was received, the communications speechlet 170 may query the configuration library 172 to determine if the device has prerequisites to fulfill the request and/or what the prerequisites are. The communications speechlet 170 may additionally query the configuration library 172 to determine if the recipient device (s) have prerequisites to fulfill the request and/or what those prerequisites are.

The status component 174 may be configured to identify, determine, and/or generate request data representing a query to determine whether one or more of the prerequisites have been met and/or otherwise to acquire a status of the voice-enabled device 102. The voice-enabled device 102, based at least in part on receiving the request data, may identify, determine, and/or generate status data indicating a current status of the voice-enabled device 102. For example, the status data may indicate that calling is enabled for the voice-enabled device 102 and that an auxiliary device 106 is connected to the voice-enabled device 102 via wired connection. In this example, the notification component 176 and/or the communications speechlet 170 may receive the status data from the voice-enabled device 102 and, based at least in part on determining that calling is enabled and/or that the auxiliary device 106 is connected to the voice-enabled device 102 via wired connection, generate notification data indicating that a call is incoming. The notification component 176 may send the notification data to the voice-enabled device 102. In examples, the notification data may cause the light element 122 of the voice-enabled device 102 to emit a light indicating there is an incoming call. Additionally, or alternatively, the notification data may cause the auxiliary device 106 to output audio representing a notification that a call is incoming. The user may provide an indication that the call should be answered, such as by providing a user utterance to answer the call, and the remote system 110 and/or a third-party system 178 representing a communication network may establish the communication channel between the voice-enabled device 102 and a sending device 180 that initiated the call.

In other examples, the status data received from the voice-enabled device 102 may indicate that the auxiliary device 106 is wirelessly connected to the voice-enabled device 102, but the auxiliary device 106 is not connected to the voice-enabled device 102 via wired connection. In these examples, the remote system 110 may determine that the voice-enabled device 102 should not receive the notification of an incoming call. For example, while a communication channel may be established between the voice-enabled device 102 and the sending device 180 that initiated the call, in situations where the auxiliary device 106 is wirelessly connected, doing so may result in a call with poor audio quality for the sending device 180 and/or the voice-enabled device 102. As such, the remote system 110 may determine that calling may be enabled for the voice-enabled device 102 when the auxiliary device 106 is connected via a wired connection. In these examples, given that the auxiliary device 106 is wirelessly connected to the voice-enabled device 102, the notification component 176 may send audio data to the voice-enabled device 102, which may send the audio data to the auxiliary device 106 to output corresponding audio. The audio may represent a notification that the voice-enabled device 102 is not connected to the auxiliary device 106 via wired connection and/or to enable calling on the voice-enabled device 102, the auxiliary device 106 should be physically plugged into the voice-enabled device 102. Additionally, or alternatively, an alert may be sent from the remote system 110 to a mobile device 108 associated with the user account. The alert may provide an indication that the voice-enabled device 102 is not connected to the auxiliary device 106 via wired connection and/or to enable calling on the voice-enabled device 102, the auxiliary device 106 should be physically plugged into the voice-enabled device 102.

By way of further example, the communications system 162 may receive request data to send a message to one or more devices associated with the user account. The message may include audio data from a user of a sending device 180 and/or audio data generated from text data provided by a user of the sending device 180. In these examples, the communications system 162 may determine the device type and/or device functionalities of the voice-enabled device 102, as described above. Based at least in part on determining that the voice-enabled device 102 is of the first type, the communications system 162 may determine whether one or more prerequisites are associated with sending message data to the voice-enabled device 102. In examples, the prerequisites may include determining whether messaging is enabled on the voice-enabled device 102, whether the voice-enabled device 102 is wirelessly connected to the auxiliary device 106, and/or whether the auxiliary device 106 is connected to the voice-enabled device 102 via a wired connection.

Status data indicating whether the one or more prerequisites are met may be sent from the voice-enabled device 102 to the communication system 162. In examples, the status data may indicate that messaging is enabled and that the voice-enabled device 102 is connected to the auxiliary device 106 via wired connection and/or wirelessly. In these examples, a notification that a message has been received may be sent from the notification component 176 to the voice-enabled device 102. Upon receiving input from the user to output the message, the communications system 162 may send audio data representing the message to the voice-enabled device 102, which may cause the auxiliary device 106 to output audio corresponding to the audio data.

In other examples, the status data may indicate that messaging is enabled but that the voice-enabled device 102 is not connected to the auxiliary device 106 via wired connection or wirelessly. In these examples, a speaker or an audio-output transducer is absent from the voice-enabled device 102 and thus audio cannot be output from the voice-enabled device 102. Based at least in part on this status data, the communications system 162 may determine that messaging is not available for the voice-enabled device 102 and may not send a notification that a message has been received to the voice-enabled device 102. The notification component 176 may send an alert to the mobile device 108 indicating that messaging is unavailable for the voice-enabled device 102 and/or instructions for enabling messaging. Other voice-enabled devices 104 associated with the user account that have a speaker or an audio-output transducer and/or that are connected to the auxiliary device 106 may receive the notification that the message has been received.

Additionally, or alternatively, for outbound calling where the voice-enabled device 102 is attempting to initiate a call with one or more recipient devices 180, microphones 120 of the voice-enabled device 102 may receive audio representing a user utterance and may generate corresponding audio data. The audio data may be sent to the remote system 110 for speech processing, which may include determining intent data indicating that the user utterance includes a request to establish a communication channel between the voice-enabled device 102 and one or more devices 180 associated with a given user account. In these examples, the communications system 162 may determine whether the voice-enabled device 102 is of a type that includes a speaker or an audio-output transducer. If the voice-enabled device 102 includes a speaker or an audio-output transducer, a request to establish the communication channel may be sent to the third-party system 178 associated with a communication network and/or to the recipient device 180.

If the voice-enabled device 102 does not include a speaker or an audio-output transducer, the communications system 162 may identify one or more prerequisites from the configuration library 172, similar to those described above for calling functionality. The communications system 162 may send request data to the voice-enabled device 102 to determine whether the prerequisites have been met. Status data may be received from the voice-enabled device 102 indicating, in examples, that calling is enabled and that the voice-enabled device 102 is connected to the auxiliary device 106 via wired connection. In these examples, the communications system 162 may determine that the prerequisites for initiating a call have been met and may send a request to establish a communication channel to the third-party system 178 associated with the communication network and/or to the receiving device 180. In other examples, the status data may indicate that calling is enabled and that the voice-enabled device 102 is wirelessly connected to the auxiliary device 106, but that the voice-enabled device 102 is not connected to the auxiliary device 106 via wired connection. In these examples, the communications system 162 may determine that the prerequisites for initiating a call have not been met, and, for example, may notify the user that the call cannot be placed.

Additionally, or alternatively, for outbound messaging. The communications system 162 may identify one or more prerequisites similar to those described above for messaging functionality, and may send request data to the voice-enabled device 102 to determine whether the prerequisites have been met. Status data may be received from the voice-enabled device 102 indicating, in examples, that messaging is enabled and that the voice-enabled device 102 is connected to the auxiliary device 106 via wired and/or wireless connection. In these examples, the communications system 162 may determine that the prerequisites for sending a message have been met and may send a request to send the message to the third-party system 178 associated with the communication network and/or to the receiving device 180. In other examples, the status data may indicate that messaging is enabled and that the voice-enabled device 102 is not connected to the auxiliary device 106 via wired or wireless connection. In these examples, the communications system 162 may determine that the prerequisites for sending a message have not been met, and, for example, may notify the user that the message cannot be sent.

Additionally, or alternatively, the communications system 162 may determine that an auxiliary device 106 has been disconnected from the voice-enabled device 102 and/or that the auxiliary device 106 has been disabled and/or has "fallen asleep," and may terminate a communication channel based at least in part on this determination. For example, during a call, users of the devices that are part of the communication channel may depend on receiving audio to determine whether a call is in progress and/or whether a call has ended. As such, if an auxiliary device 106 becomes disconnected and/or otherwise is disabled during a call, one or more of the users may not know that the communication channel is still established and that audio data is still being transmitted. In these and other examples, the communications system 162 may determine when the auxiliary device 106 is unplugged from the voice-enabled device 102 and/or when the auxiliary device 106 is disabled, powered off, or enters into a "sleep mode" where the device is still on but is not outputting audio even when audio data is being received. Determining that a device has been disconnected and/or disabled may be based at least in part on a signal received from the auxiliary device, on a response to a query for a status of the auxiliary device, occurrence of an event such as a sensor indicating that the auxiliary device has been disconnected, and/or the voice-enabled device 102 and/or the remote system 110 determining that audio data received from the microphones 120 of the voice-enabled device does not include at least a portion of the audio data received from the remote system, for example.

The device-selection component 177 may be configured to utilize the data described with respect to the configuration library 172 and/or the status component 174 to determine which voice-enabled device associated with a given user account should be sent a notification associated with audio data for output. The device-selection component 177 may select those voice-enabled devices that include a speaker and/or an audio-output transducer. The device-selection component 177 may also select those voice-enabled devices that do not include a speaker and/or an audio-output transducer in examples where the one or more prerequisites described herein have been met. The device-selection component 177 may refrain from selecting voice-enabled device that do not have a speaker and/or an audio-output transducer where one or more of the prerequisites have not been met.

In light of the above and as described herein, the components of the communications system 162 may be configured to enable and/or disable calling and/or messaging functionality depending on the type of voice-enabled device that is involved and whether certain prerequisites have been met.

It should be noted that while text data is described as a type of data utilized to communicate between various components of the remote system 110 and/or other systems and/or devices, the components of the remote system 110 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the voice-enabled devices 102, 104.

As shown in FIG. 1, several of the components of the remote system 110 and the associated functionality of those components as described herein may be performed by one or more of the voice-enabled devices 102, 104, the auxiliary devices 106, and/or the mobile device 108. Additionally, or alternatively, some or all of the components and/or functionalities associated with the voice-enabled devices 102, 104, the auxiliary devices 106, and/or the mobile device 108 may be performed by the remote system 110.

It should be noted that the exchange of data and/or information as described herein may be performed only in situations where a user has provided consent for the exchange of such information. For example, upon setup of devices and/or initiation of applications and/or skills, a user may be provided with the opportunity to opt in and/or opt out of data exchanges between devices and/or with the remote system and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 114, 128, 138, 150, and/or the processor(s) described with respect to the components of the remote system 110, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 114, 128, 138, 150, and/or the processor(s) described with respect to the components of the remote system 110 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 114, 128, 138, 150, and/or the processor(s) described with respect to the components of the remote system 110 may possess its own local memory, which also may store program components, program data, and/or one or more operating systems.

The memory 118, 132, 142, 154, and/or the memory described with respect to the components of the remote system 110 may include volatile and nonvolatile memory, removable and non-removable media implemented in any method or technology for storage of information, such as computer-readable instructions, data structures, program component, or other data. Such memory 118, 132, 142, 154, and/or the memory described with respect to the components of the remote system 110 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 118, 132, 142, 154, and/or the memory described with respect to the components of the remote system 110 may be implemented as computer-readable storage media ("CRSM"), which may be any available physical media accessible by the processor(s) 114, 128, 138, 150, and/or the processor(s) described with respect to the remote system 110 to execute instructions stored on the memory 118, 132, 142, 154, and/or the memory described with respect to the components of the remote system 110. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 118, 132, 142, 154, and/or the memory described with respect to the components of the remote system 110, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 116, 130, 140, 152, and/or the network interface(s) described with respect to the components of the remote system 110 may enable messages between the components and/or devices shown in system 100 and/or with one or more other remote systems, as well as other networked devices. Such network interface(s) 116, 130, 140, 152, and/or the network interface(s) described with respect to the components of the remote system 110 may include one or more network interface controllers (NICs) or other types of transceiver devices to send and receive messages over the network 112.

For instance, each of the network interface(s) 116, 130, 140, 152, and/or the network interface(s) described with respect to the components of the remote system 110 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 116, 130, 140, 152, and/or the network interface(s) described with respect to the components of the remote system 110 may include a wide area network (WAN) component to enable message over a wide area network.

In some instances, the remote system 110 may be local to an environment associated the voice-enabled devices 102, 104, and/or the mobile device 108. For instance, the remote system 110 may be located within one or more of the voice-enabled devices 102, 104 and/or the mobile device 108. In some instances, some or all of the functionality of the remote system 110 may be performed by one or more of the voice-enabled devices 102, 104 and/or the mobile device 108. Also, while various components of the remote system 110 have been labeled and named in this disclosure and each component has been described as being configured to cause the processor(s) to perform certain operations, it should be understood that the described operations may be performed by some or all of the components and/or other components not specifically illustrated.

Figure 2A:
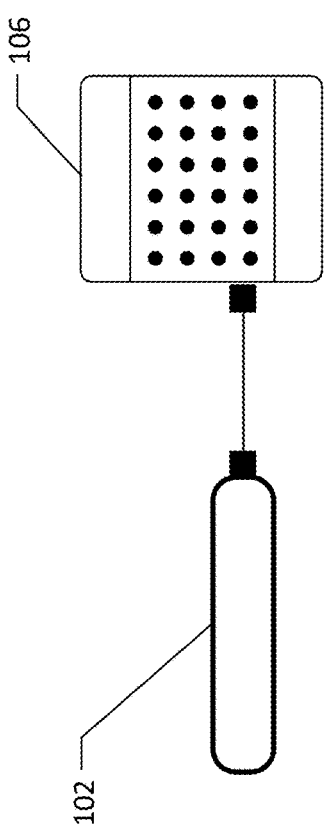
FIG. 2A illustrates an example voice-enabled device and an example auxiliary device showing wireless and wired connection.

FIG. 2A illustrates an example voice-enabled device 102 and an example auxiliary device 106 showing wireless and wired connection. The voice-enabled device 102 may include the same or similar components as described with respect to FIG. 1. Additionally, the voice-enabled device 102 may perform the same or similar functions as described with respect to FIG. 1.

For example, the voice-enabled device 102 may not include audio-output functionality, such as a speaker. However, the voice-enabled device 102 may be configured to connect to the auxiliary device 106, which may include a speaker or an audio-output transducer, via wired and/or wireless connection. In the example, FIG. 2A, the voice-enabled device 102 is connected to the auxiliary device 106 via wired and wireless connection. In these examples, outbound and inbound calling, and outbound and inbound messaging may be enabled as follows.

For inbound calling, a remote system may send request data to the voice-enabled device 102 representing a query to determine whether one or more prerequisites have been met and/or otherwise to acquire a status of the voice-enabled device 102. The voice-enabled device 102, based at least in part on receiving the request data, may identify, determine, and/or generate status data indicating a current status of the voice-enabled device 102. For example, the status data may indicate that calling is enabled for the voice-enabled device 102 and that, in the example of FIG. 2A, the auxiliary device 106 is connected to the voice-enabled device 102 via wired and wireless connection. In this example, the remote system may receive the status data from the voice-enabled device 102 and, based at least in part on determining that calling is enabled and/or that the auxiliary device 106 is connected to the voice-enabled device 102 via wired connection, may send notification data to the voice-enabled device 102 indicating that a call is incoming.

For inbound messaging, the remote system may send request data to the voice-enabled device 102 representing a query to determine whether one or more prerequisites for messaging have been met and/or otherwise to acquire a status of the voice-enabled device 102. The voice-enabled device 102, based at least in part on receiving the request data, may identify, determine, and/or generate status data indicating a current status of the voice-enabled device 102. Status data indicating whether the one or more prerequisites are met may be sent from the voice-enabled device 102 to the remote system. In examples, the status data may indicate that messaging is enabled and that the voice-enabled device 102 is connected to the auxiliary device 106 via wired connection and/or wirelessly. In these examples, a notification that a message has been received may be sent to the voice-enabled device 102.

For outbound calling, microphones of the voice-enabled device 102 may receive audio representing a user utterance and may generate corresponding audio data. The audio data may be sent to the remote system for speech processing, which may include determining intent data indicating that the user utterance includes a request to establish a communication channel between the voice-enabled device 102 and one or more devices associated with a given user account. In these examples, the remote system may determine whether the voice-enabled device 102 is of a type that includes a speaker or an audio-output transducer. If the voice-enabled device 102 does not include a speaker or an audio-output transducer, the remote system may identify one or more prerequisites, similar to those described above for calling functionality. The remote system may send request data to the voice-enabled device 102 to determine whether the prerequisites have been met. Status data may be received from the voice-enabled device 102 indicating, in examples, that calling is enabled and that the voice-enabled device 102 is connected to the auxiliary device 106 via wired connection. In these examples, the remote system may determine that the prerequisites for initiating a call have been met and may send a request to establish a communication channel to a third-party system associated with the communication network and/or to the receiving device.

For outbound messaging, the remote system may identify one or more prerequisites similar to those described above for messaging functionality, and may send request data to the first voice-enabled device 102 to determine whether the prerequisites have been met. Status data may be received from the voice-enabled device 102 indicating, in examples, that messaging is enabled and that the voice-enabled device 102 is connected to the auxiliary device 106 via wired and/or wireless connection. In these examples, the remote system may determine that the prerequisites for sending a message have been met and may send a request to send the message to the third-party system associated with the communication network and/or to the receiving device.

Figure 2B:
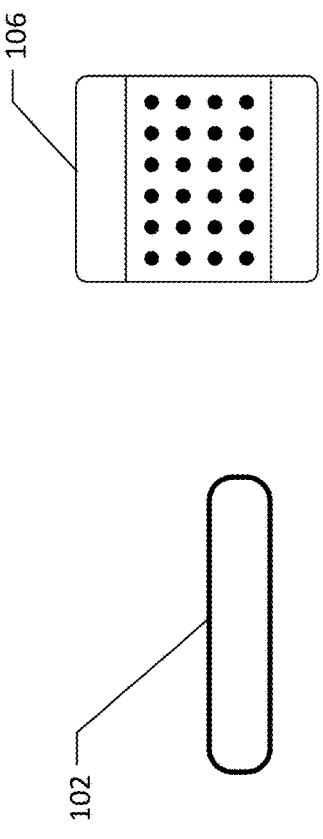
FIG. 2B illustrates another example voice-enabled device and another example auxiliary device showing wired connection.

FIG. 2B illustrates another example voice-enabled device 102 and another example auxiliary device 106 showing wired connection but not wireless connection. The voice-enabled device 102 may include the same or similar components as described with respect to FIG. 1. Additionally, the voice-enabled device 102 may perform the same or similar functions as described with respect to FIG. 1. For example, the voice-enabled device 102 may not include audio-output functionality, such as a speaker. However, the voice-enabled device 102 may be configured to connect to the auxiliary device 106, which may include a speaker or an audio-output transducer, via wired and/or wireless connection. In the example of FIG. 2B, the voice-enabled device 102 is connected to the auxiliary device 106 via wired connection but not wireless connection. In these examples, outbound and inbound calling, and outbound and inbound messaging may be enabled in the same or a similar manner as described with respect to FIG. 2A. In other words, when the voice-enabled device 102 is connected to the auxiliary device 106 via wired connection, inbound calling, inbound messaging, outbound calling, and/or outbound messaging are enabled.

Figure 2C:
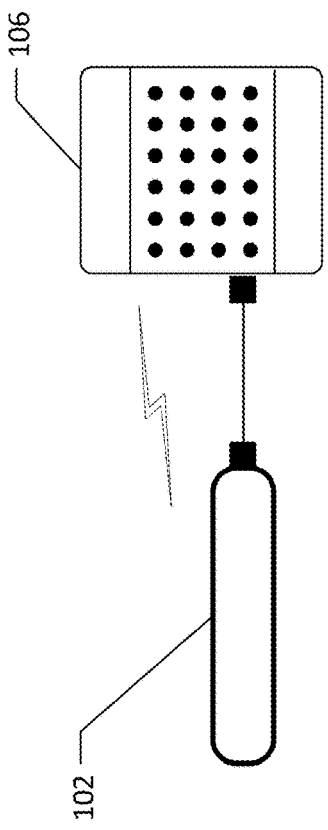
FIG. 2C illustrates another example voice-enabled device and another example auxiliary device showing wireless connection.

FIG. 2C illustrates another example voice-enabled device 102 and another example auxiliary device 106 showing wireless connection. The voice-enabled device 102 may include the same or similar components as described with respect to FIG. 1. Additionally, the voice-enabled device 102 may perform the same or similar functions as described with respect to FIG. 1. For example, the voice-enabled device 102 may not include audio-output functionality, such as a speaker. However, the voice-enabled device 102 may be configured to connect to the auxiliary device 106, which may include a speaker or an audio-output transducer, via wired and/or wireless connection. In the example of FIG. 2C, the voice-enabled device 102 is connected to the auxiliary device 106 via wireless connection but not wired connection. In these examples, outbound and inbound calling, and outbound and inbound messaging may be enabled as follows.

For inbound calling, a remote system may send request data to the voice-enabled device 102 representing a query to determine whether one or more prerequisites have been met and/or otherwise to acquire a status of the voice-enabled device 102. The voice-enabled device 102, based at least in part on receiving the request data, may identify, determine, and/or generate status data indicating a current status of the voice-enabled device. The status data received from the voice-enabled device 102 may indicate that the auxiliary device 106 is wirelessly connected to the voice-enabled device 102, but the auxiliary device 106 is not connected to the voice-enabled device 102 via wired connection. In these examples, the remote system may determine that the voice-enabled device 102 should not receive the notification of an incoming call. For example, while a communication channel may be established between the voice-enabled device 102 and the sending device that initiated the call, in situations where an auxiliary device 106 is wirelessly connected, doing so may result in a call with poor audio quality for the sending and/or the receiving devices. As such, the remote system may determine that calling may be enabled for the voice-enabled device 102 when the auxiliary device 106 is connected via a wired connection. In these examples, given that the auxiliary device 106 is wirelessly connected to the voice-enabled device 102, the remote system may send audio data to the voice-enabled device 102, which may send the audio data to the auxiliary device to output corresponding audio. The audio may represent a notification that the voice-enabled device 102 is not connected to the auxiliary device 106 via wired connection and/or to enable calling on the voice-enabled device 102, the auxiliary device 106 should be physically plugged into the voice-enabled device 102. Additionally, or alternatively, an alert may be sent from the remote system to a mobile device associated with the user account. The alert may provide an indication that the voice-enabled device 102 is not connected to the auxiliary device 106 via wired connection and/or to enable calling on the voice-enabled device 102, the auxiliary device 106 should be physically plugged into the voice-enabled device 102.

For inbound messaging, the remote system may send request data to the voice-enabled device 102 representing a query to determine whether one or more prerequisites for messaging have been met and/or otherwise to acquire a status of the voice-enabled device 102. The voice-enabled device 102, based at least in part on receiving the request data, may identify, determine, and/or generate status data indicating a current status of the voice-enabled device 102. The status data received from the voice-enabled device 102 may indicate that the auxiliary device 106 is wirelessly connected to the voice-enabled device 102, but the auxiliary device 106 is not connected to the voice-enabled device 102 via wired connection. Based at least in part on the status data, the remote system may determine that messaging is enabled and may send a notification that a message has been received to the voice-enabled device 102.

For outbound calling, the status data may indicate that calling is enabled and that the voice-enabled device 102 is wirelessly connected to the auxiliary device 106, but that the voice-enabled device 102 is not connected to the auxiliary device 106 via wired connection. In these examples, the remote system may determine that the prerequisites for initiating a call have not been met, and, for example, may notify the user that the call cannot be placed.

For outbound messaging, the status data may indicate that messaging is enabled and that the voice-enabled device 102 is wirelessly connected to the auxiliary device 106, but that the voice-enabled device 102 is not connected to the auxiliary device 106 via wired connection. In these examples, the remote system may determine that the prerequisites for sending a message have been met, and, for example, may send request data to the receiving device to accept the message.

Figure 2D:
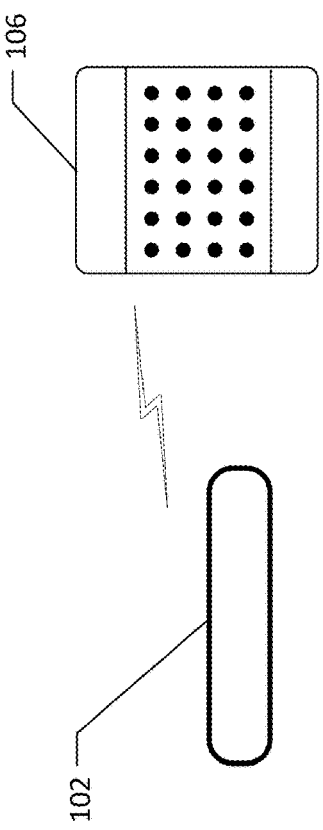
FIG. 2D illustrates another example voice-enabled device and another example auxiliary device showing no wireless or wired connection.

FIG. 2D illustrates another example voice-enabled device 102 and another example auxiliary device 106 showing no wireless or wired connection. The voice-enabled device 102 may include the same or similar components as described with respect to FIG. 1. Additionally, the voice-enabled device 102 may perform the same or similar functions as described with respect to FIG. 1. For example, the voice-enabled device 102 may not include audio-output functionality, such as a speaker. However, the voice-enabled device 102 may be configured to connect to the auxiliary device 106, which may include a speaker or an audio-output transducer, via wired and/or wireless connection. In the example of FIG. 2D, the voice-enabled device 102 is not connected to the auxiliary device 106 via wireless connection or wired connection. In these examples, outbound and inbound calling, and outbound and inbound messaging may be disabled. The remote system may send an alert to the mobile device indicating that calling and/or messaging is unavailable for the voice-enabled device 102 and/or instructions for enabling calling and/or messaging. Other voice-enabled devices associated with the user account that have a speaker or an audio-output transducer and/or that are connected to the auxiliary device 106 may receive the notification of an incoming call or message.

FIG. 3 illustrates example components of a voice-enabled device 300. The voice-enabled device 300 may include the same or similar components, and/or may perform the same or similar functions as the first voice-enabled device 102 described with respect to FIG. 1. For example, the voice-enabled device 300 may include one or more microphones 120. In the example of FIG. 3, there may be four microphones 120 arranged in a square-like geometry with respect to each other. Audio including a user utterance may be received by some or all of the microphones 120 and the microphones 120 may generate audio data. The audio data may be formatted, including for example using beamforming techniques and/or echo cancelation techniques, before the audio data is sent from the voice-enabled device 102 to the remote system. It should be noted that while four microphones are depicted in FIG. 3 and those microphones are arranged in a given geometry, the voice-enabled device 300 may include one, two, three, four, or more than four microphones. Additionally, the microphones may be arranged in any geometry and may be any distance from each other.

The voice-enabled device 300 may also include a light element 122. In examples, notification data received from the remote system may cause the light element 122 to emit a light indicating there is an incoming call and/or that a message has been received. The light element 122 may be configured to emit light such as in response to the voice-enabled device 300 receiving lighting data from the remote system and/or one or more of the other devices. The light element 122 may include, for example, light emitting diodes such that one or more colors and/or one or more light intensities may be emitted.

The voice-enabled device 300 may also include a mute button 302, which may be actuatable, such as via tactile input by a user of the voice-enabled device 300. Upon actuation of the mute button 302, the microphones 120 may cease receiving audio and/or the microphones 120 may cease generating audio data from received audio. The light element 122 may display light as an indication that the mute button 302 has been actuated. In other examples, the mute button 302 itself may include a light element that emits light to provide a visual indication of whether the microphones 120 have been muted.

The voice-enabled device 300 may also include an action button 304, which may be actuatable, such as via tactile input by a user of the voice-enabled device 300. Upon actuation of the action button 304, the microphones 120 may begin to generate audio data from audio received at the microphones 120. In other examples, the microphones 120 may begin to generate audio data for sending to the remote system upon the detection of a wake word, as described more fully below with respect to FIG. 13.

FIGS. 4-10 illustrate processes for voice-enabled communication configurations. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3 and 11A-14, although the processes may be implemented in a wide variety of other environments, architectures and systems.

Figure 4:
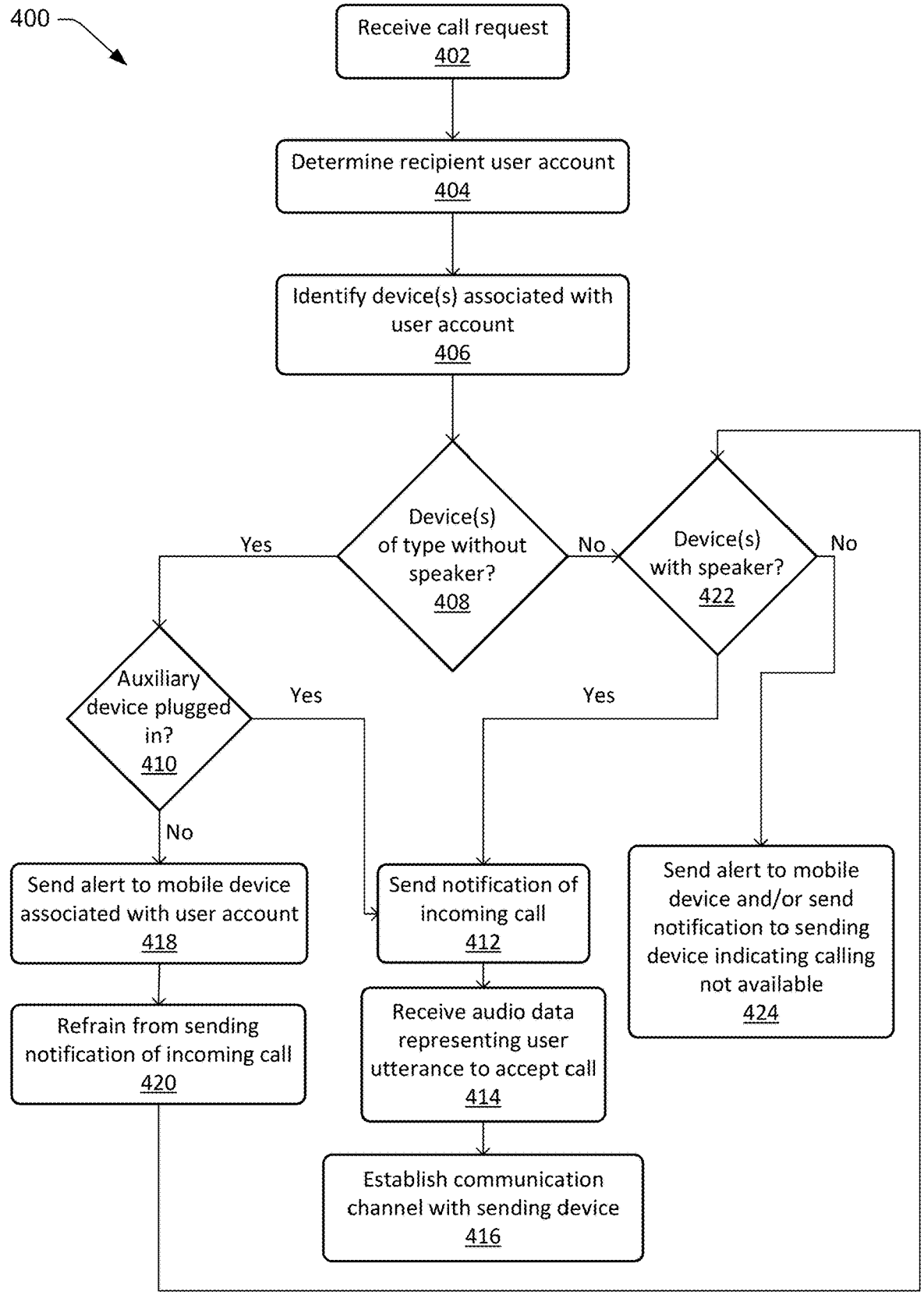
FIG. 4 illustrates a flow diagram of an example process for outbound calling using a voice-enabled device.

FIG. 4 illustrates a flow diagram of an example process 400 for outbound calling using a voice-enabled device. The order in which the operations or steps are described is not intended to be construed as a limitation, and any number of the described operations may be combined in any order and/or in parallel to implement process 400.

At block 402, the process 400 may include receiving a call request. For example, a remote system may receive request data indicating that a device has requested to initiate a call. A device, such as a voice-enabled device may have requested to place a call and/or establish a communication channel with one or more devices associated with a given user account and/or account identifier. For example, a user of a voice-enabled device may have provided a user utterance of "Call Rob's Home." The remote system may process audio data corresponding to the user utterance to determine an intent to establish a communication channel with devices associated with "Rob's Home."

At block 404, the process 400 may include determining a recipient user account for the call. Using the example from above, audio data corresponding to the user utterance of "Call Rob's Home" may include an identifier of the user account for recipient and/or receiving devices. In this example, "Rob's Home" may correspond to an identifier of a user account have multiple devices associated with it.

At block 406, the process 400 may include identifying one or more devices, such as voice-enabled devices, associated with the user account. For example, a user registry of the remote system may store data indicating, for a given user account, devices associated with the user account. The devices may include voice-enabled devices, auxiliary devices, and/or mobile devices, for example.

At block 408, the process 400 may include determining whether the device(s) are of a type without a speaker and/or an audio-output transducer. For example, the remote system may determine that a first voice-enabled device is of a first type that does not include audio-output functionality, such as a speaker, while a second voice-enabled device is of a second type that does include a speaker or an audio-output transducer. Based at least in part on determining that the first voice-enabled device is of the first type, the remote system may determine whether one or more prerequisites are associated with establishing a communication channel with the first voice-enabled device. In examples, the prerequisites may include determining whether calling is enabled on the first voice-enabled device, whether the first voice-enabled device is wirelessly connected to an auxiliary device with a speaker or an audio-output transducer, and/or whether the auxiliary device is connected to the first voice-enabled device via a wired connection.

If a voice-enabled device is of the type without a speaker and/or an audio-output transducer, the process 400 may include, a block 410, determining whether an auxiliary device is connected to the voice-enabled device via wired connection. The remote system may send request data to the first voice-enabled device representing a query to determine whether one or more of the prerequisites have been met and/or otherwise to acquire a status of the first voice-enabled device. The first voice-enabled device, based at least in part on receiving the request data, may identify, determine, and/or generate status data indicating a current status of the first voice-enabled device. For example, the status data may indicate that calling is enabled for the first voice-enabled device and that an auxiliary device is connected to the first voice-enabled device via wired connection.

If the auxiliary device is connected to the voice-enabled device via wired connection, then the process 400, at block 412, may include sending a notification of an incoming call to the voice-enabled device. In this example, the remote system may receive the status data from the first voice-enabled device and, based at least in part on determining that calling is enabled and/or that the auxiliary device is connected to the first voice-enabled device via wired connection, may send notification data to the first voice-enabled device indicating that a call is incoming. In examples, the notification data may cause a light element of the first voice-enabled device to emit a light indicating there is an incoming call. Additionally, or alternatively, the notification data may cause the auxiliary device to output audio representing a notification that a call is incoming.

At block 414, the process 400 may include receiving, from the voice-enabled device, audio data representing a user utterance to accept the call. For example, a user may provide an indication that the call should be answered, which may include a user utterance captured by microphones of the first voice-enabled device. Corresponding audio data may be generated and sent to the remote system.

At block 416, the process 400 may include establishing a communication channel between the sending device and the voice-enabled device. For example, the remote system and/or a third-party system representing a communication network may establish the communication channel between the first voice-enabled device and a sending device that initiated the call. Establishing a communication channel is described in more detail with respect to FIGS. 10A, 10B, 11A, and 11B.

Returning to block 410, if the auxiliary device is not connected to the voice-enabled device via wired connection, the process 400, at block 418, may include sending an alert to a mobile device associated with the user account. The alert may provide an indication that the first voice-enabled device is not connected to the auxiliary device via wired connection and/or to enable calling on the first voice-enabled device, the auxiliary device should be physically plugged into the first voice-enabled device. It should be noted that the process 400 may not include block 418, and instead if the auxiliary device is not connected to the voice-enabled device via wired connection, the process 400 may continue to block 420.

At block 420, the process 400 may include refraining from sending the notification of the incoming call to the voice-enabled device. For example, when the user account includes devices capable of establishing a communication channel with, the remote system may determine which of those devices to send the notification of the incoming call to. The remote system may select those devices with calling capability, and in this example where the first voice-enabled device is not connected to the auxiliary device via wired connection, the remote system may refrain from including the first voice-enabled device in the devices that receive the notification.

In examples where the voice-enabled device is wirelessly connected to the auxiliary device, the process 400 may include sending a notification to the voice-enabled device that calling is not available and/or that to enable calling the user should plug the auxiliary device into the voice-enabled device. In these examples, given that the auxiliary device is wirelessly connected to the first voice-enabled device, the remote system may send audio data to the first voice-enabled device, which may send the audio data to the auxiliary device to output corresponding audio. The audio may represent a notification that the first voice-enabled device is not connected to the auxiliary device via wired connection and/or to enable calling on the first voice-enabled device, the auxiliary device should be physically plugged into the first voice-enabled device.

Returning to block 408, if there are no additional devices without a speaker and/or an audio-output transducer and/or if it is determined that a first voice-enabled device is not connected to the auxiliary device via wired connection, the process 400 may include, at block 422, determining whether there are one or more other devices that do have a speaker or an audio-output transducer. This process may include determining whether other devices are associated with the user account and determining if those devices have a speaker or an audio-output transducer.

If one or more voice-enabled devices are determined to have a speaker or an audio-output transducer, the process 400 may continue to block 412 where a notification of the incoming call may be sent to those devices. Sending of the notification of the incoming call may be performed in the same or a similar manner as described above.

If one or more voice-enabled devices having audio-output functionality are not identified, the process 400 may continue to block 424, where a notification may be sent to the sending device indicating that calling functionality is not available to device associated with the recipient user account. In these examples, the remote system has determined that while devices are associated with the recipient user account, none of those devices are configured for receiving a call. As such, the remote system may generate a notification indicating that calling is not available, and the remote system may send that notification to the sending device. Additionally, or alternatively, an alert may be sent to the mobile device associated with the user account. The alert may be similar to the alert described with respect to block 418.

Figure 5:
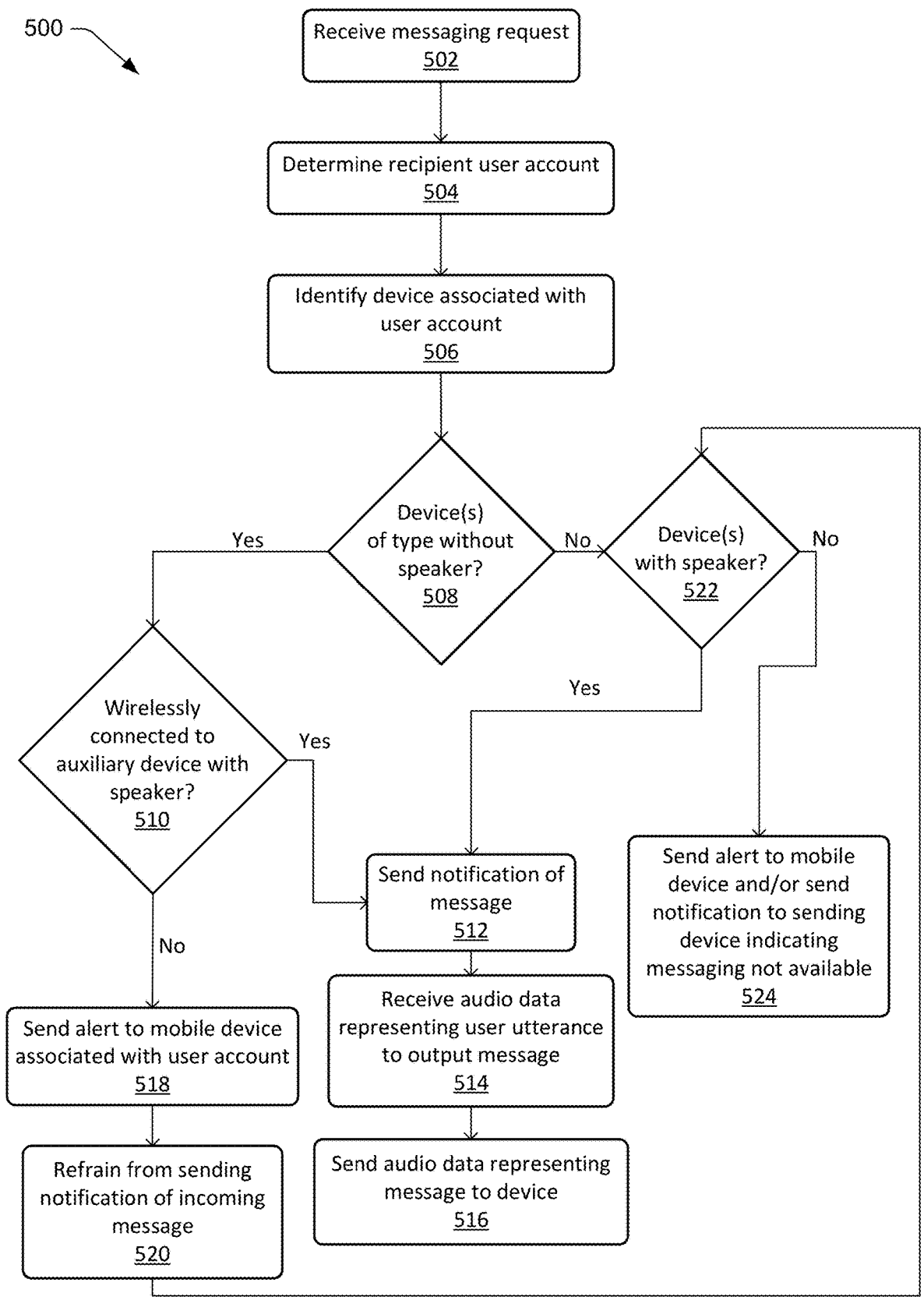
FIG. 5 illustrates a flow diagram of an example process for outbound messaging using a voice-enabled device.

FIG. 5 illustrates a flow diagram of an example process 500 for outbound messaging using a voice-enabled device. The order in which the operations or steps are described is not intended to be construed as a limitation, and any number of the described operations may be combined in any order and/or in parallel to implement process 500.

At block 502, the process 500 may include receiving a messaging request from a sending device. Request data may be received at a remote system indicating that the sending device is requesting to send a message to another device or devices. A device, such as a voice-enabled device may have requested to send a message to one or more devices associated with a given user account and/or account identifier. For example, a user of a voice-enabled device may have provided a user utterance of "Send a message to Rob's Home." The remote system may process audio data corresponding to the user utterance to determine an intent to send a message to devices associated with "Rob's Home."

At block 504, the process 500 may include determining a recipient user account. Using the example from above, audio data corresponding to the user utterance of "Send a message to Rob's Home" may include an identifier of the user account for recipient and/or receiving devices. In this example, "Rob's Home" may correspond to an identifier of a user account have multiple devices associated with it.

At block 506, the process 500 may include identifying one or more devices associated with the user account. For example, a user registry of the remote system may store data indicating, for a given user account, devices associated with the user account. The devices may include voice-enabled devices, auxiliary devices, and/or mobile devices, for example.

At block 508, the process 500 may include determining whether one or more of the devices are of a type without a speaker or an audio-output transducer. For example, the remote system may determine that a first voice-enabled device is of a first type that does not include audio-output functionality, such as a speaker, while a second voice-enabled device is of a second type that does include audio-output functionality. Based at least in part on determining that the first voice-enabled device is of the first type, the remote system may determine whether one or more prerequisites are associated with sending and/or receiving a message. In examples, the prerequisites may include determining whether messaging is enabled on the first voice-enabled device, whether the first voice-enabled device is wirelessly connected to an auxiliary device with a speaker or an audio-output transducer, and/or whether the auxiliary device is connected to the first voice-enabled device via a wired connection.

If one or more of the devices are of the type without a speaker or an audio-output transducer, then at block 510 the process 500 may include determining whether the voice-enabled device is wirelessly connected to an auxiliary device with a speaker or an audio-output transducer. The remote system may send request data to the first voice-enabled device representing a query to determine whether one or more of the prerequisites have been met and/or otherwise to acquire a status of the first voice-enabled device. The first voice-enabled device, based at least in part on receiving the request data, may identify, determine, and/or generate status data indicating a current status of the first voice-enabled device. For example, the status data may indicate that messaging is enabled for the first voice-enabled device and that an auxiliary device is wirelessly connected to the first voice-enabled device.

If the voice-enabled device is wirelessly connected to the auxiliary device, then at block 512, the process 500 may include sending a notification that a message has been received to the voice-enabled device. In this example, the remote system may receive the status data from the first voice-enabled device and, based at least in part on determining that calling is enabled and/or that the auxiliary device is wirelessly connected to the first voice-enabled device, may send notification data to the first voice-enabled device indicating that a message has been received. In examples, the notification data may cause a light element of the first voice-enabled device to emit a light indicating there is an incoming message. Additionally, or alternatively, the notification data may cause the auxiliary device to output audio representing a notification that a message is incoming.

At block 514, the process 500 may include receiving audio data representing a user utterance to output the audio corresponding to the message. For example, a user may provide an indication that audio representing the message should be output, which may include a user utterance captured by microphones of the first voice-enabled device. Corresponding audio data may be generated and sent to the remote system.

At block 516, the process 500 may include sending audio data representing the message to the voice-enabled device for output via speakers of the auxiliary device. For example, audio data representing the message may be sent to the voice-enabled device. The audio data may represent an audio message provided by the user and/or the audio data may represent a text-to-speech file corresponding to text provided by the user.

Returning to block 510, if the voice-enabled device is not wirelessly connected to the auxiliary device, then at block 518, the process 500 may include sending an alert to a mobile device associated with the user account. The alert may provide an indication that the first voice-enabled device is not wirelessly connected to the auxiliary device and/or to enable messaging on the first voice-enabled device, the auxiliary device should be wirelessly connected to the first voice-enabled device. It should be noted that the process 500 may not include block 518, and in these examples, if the voice-enabled device is not wirelessly connected to the auxiliary device, the process 500 may continue to block 520.

At block 520, the process 500 may include refraining from sending the notification of the incoming message to the voice-enabled device. For example, when the user account includes devices capable of receiving messages, the remote system may determine which of those devices to send the notification of the incoming messages to. The remote system may select those devices with messaging capability, and in this example where the first voice-enabled device is not wirelessly connected to the auxiliary device, the remote system may refrain from including the first voice-enabled device in the devices that receive the notification.

Returning to block 508, if there are no additional devices without a speaker and/or an audio-output transducer and/or if it is determined that a first voice-enabled device is not wirelessly connected to the auxiliary device, then at block 522, the process 500 may include determining whether there are any other devices that have a speaker or an audio-output transducer. This process may include determining whether other devices are associated with the user account and determining if those devices have a speaker or an audio-output transducer.

If one or more voice-enabled devices with a speaker or an audio-output transducer are identified, then the process 500 may continue to block 512 where the notification of the incoming message may be sent to the devices with a speaker or an audio-output transducer. Sending of the notification of the incoming message may be performed in the same or a similar manner as described above.

If one or more voice-enabled devices with a speaker or an audio-output transducer are not identified, then at block 524, the process 500 may include sending a notification to the sending device indicating that messaging is not available. In these examples, the remote system has determined that while devices are associated with the recipient user account, none of those devices are configured for receiving a message. As such, the remote system may generate a notification indicating that messaging is not available, and the remote system may send that notification to the sending device. Additionally, or alternatively, the process 500 may include sending an alert to the mobile device associated with the user account. The alert may be similar to the alert described with respect to block 518.

Figure 6:
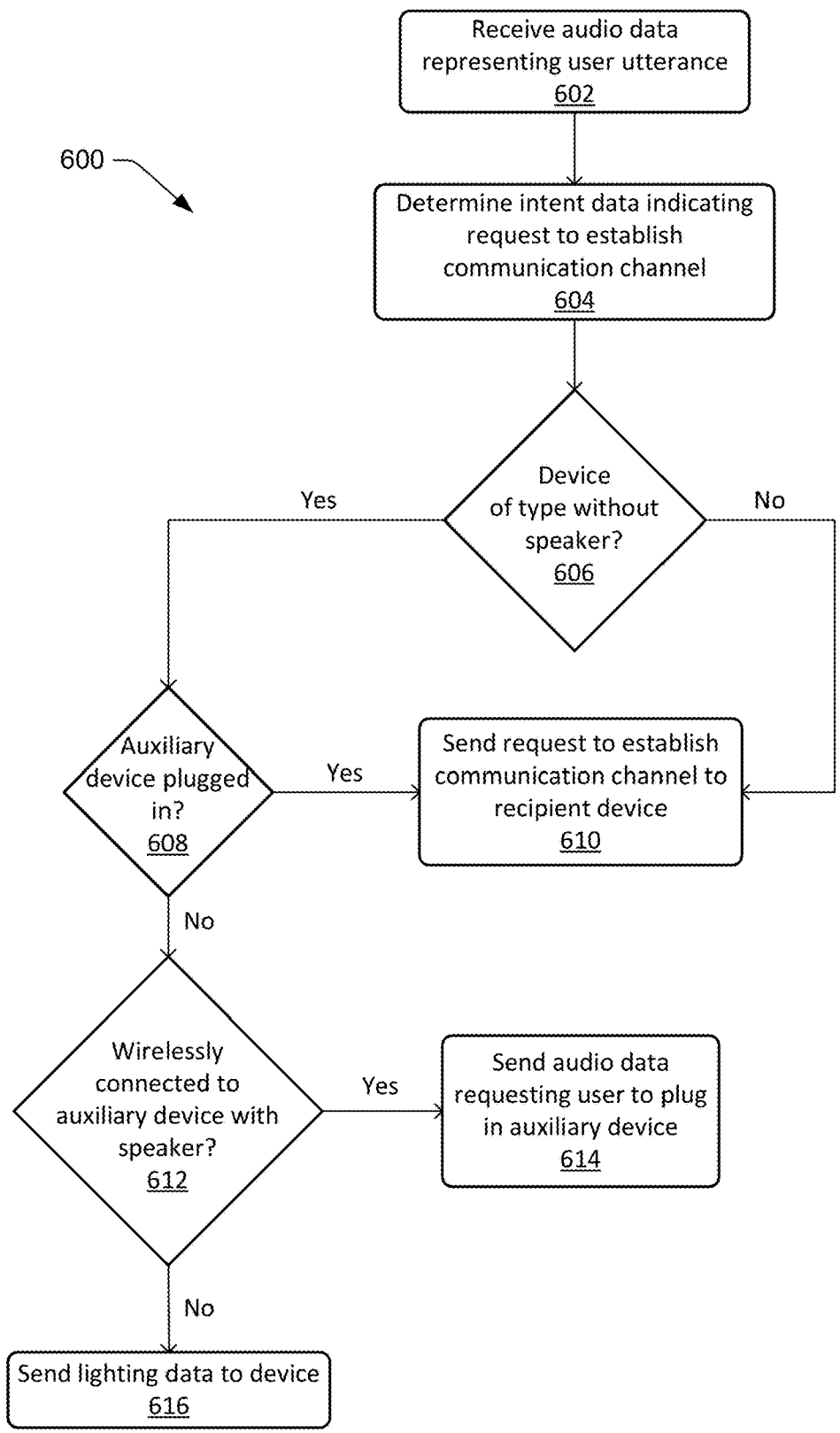
FIG. 6 illustrates a flow diagram of an example process for inbound calling using a voice-enabled device.

FIG. 6 illustrates a flow diagram of an example process 600 for inbound calling using a voice-enabled device. The order in which the operations or steps are described is not intended to be construed as a limitation, and any number of the described operations may be combined in any order and/or in parallel to implement process 600.

At block 602, the process 600 may include receiving audio data representing a user utterance. For example, a user may speaker a user utterance of "Call Rob's Home." Microphones of a voice-enabled device may receive audio corresponding to the user utterance and may generate corresponding audio data. The audio data may be sent from the voice-enabled device to a remote system for speech processing.

At block 604, the process 600 may include determining intent data indicating a request to establish a communication channel. For example, an ASR component may receive the audio data and may generate corresponding text data. An NLU component may receive the text data and may generate corresponding intent data. Using the example provided above, the intent data may indicate a "calling" intent or otherwise to establish a communication channel.

At block 606, the process 600 may include determining whether the device from which the audio data was received is of a type without a speaker or an audio-output transducer. For example, the remote system may determine that the voice-enabled device is of a first type that does not include audio-output functionality, such as a speaker. Based at least in part on determining that the voice-enabled device is of the first type, the remote system may determine whether one or more prerequisites are associated with initiating a communication channel. In examples, the prerequisites may include determining whether calling is enabled on the voice-enabled device, whether the voice-enabled device is wirelessly connected to an auxiliary device with a speaker or an audio-output transducer, and/or whether the auxiliary device is connected to the first voice-enabled device via a wired connection.

If the device is of the type without a speaker or an audio-output transducer, then at block 608, the process 600 may include determining whether an auxiliary device is connected to the voice-enabled device via wired connection. The remote system may send request data to the voice-enabled device representing a query to determine whether one or more of the prerequisites have been met and/or otherwise to acquire a status of the voice-enabled device. The voice-enabled device, based at least in part on receiving the request data, may identify, determine, and/or generate status data indicating a current status of the voice-enabled device. For example, the status data may indicate that calling is enabled for the voice-enabled device and that an auxiliary device is connected to the voice-enabled device via wired connection.

If the auxiliary device is connected to the voice-enabled device via wired connection, then at block 610, the process 600 may include sending a request to establish the communication channel to a recipient device and/or to a third-party system associated with a communications network. For example, the remote system and/or a third-party system representing a communication network may establish the communication channel between the first voice-enabled device and a sending device that initiated the call. Establishing a communication channel is described in more detail with respect to FIGS. 10A, 10B, 11A, and 11B.

If the auxiliary device is not connected to the voice-enabled device via wired connection, then at block 612, the process 600 may include determining whether the auxiliary device is wirelessly connected to the voice-enabled device. The status data received from the voice-enabled device may indicate whether the auxiliary device is wirelessly connected to the voice-enabled device.

If the auxiliary device is wirelessly connected to the voice-enabled device, then at block 614, the process 600 may include sending audio data requesting the user to plug in the auxiliary device. For example, the remote system may generate the audio data and may send the audio data to the voice-enabled device, which may cause speakers of the wirelessly-connected auxiliary device to output audio corresponding to the request to plug in the auxiliary device to enable calling.

If the auxiliary device is not connected to the voice-enabled device, then at block 616, the process 600 may include sending lighting data to the device. The lighting data may cause a light element of the device to emit light indicating that the request to establish a communication channel was not successful.

Figure 7:
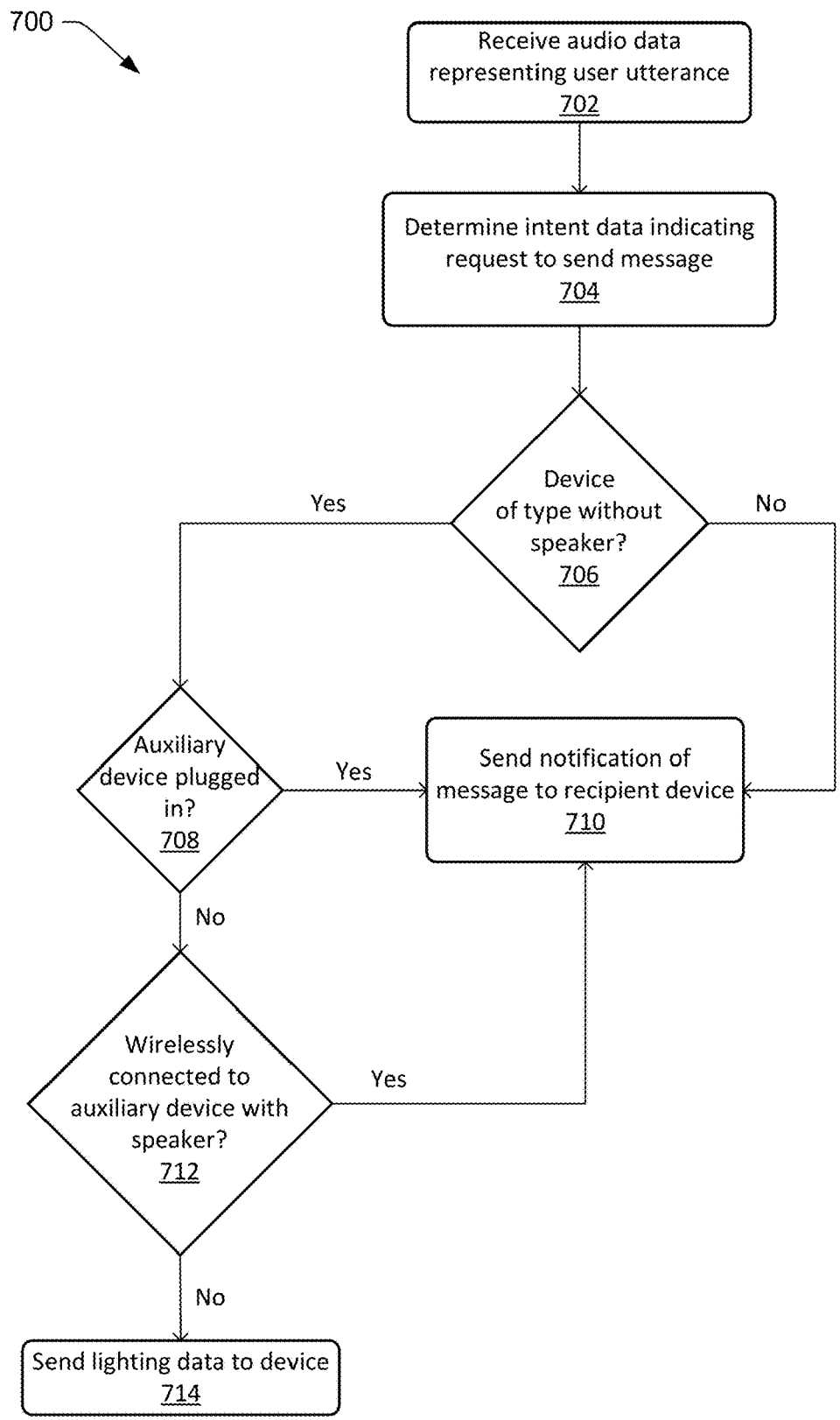
FIG. 7 illustrates a flow diagram of an example process for inbound messaging using a voice-enabled device.

FIG. 7 illustrates a flow diagram of an example process 700 for inbound messaging using a voice-enabled device. The order in which the operations or steps are described is not intended to be construed as a limitation, and any number of the described operations may be combined in any order and/or in parallel to implement process 700.

At block 702, the process 700 may include receiving audio data representing a user utterance. For example, a user may speaker a user utterance of "Send a message to Rob's Home." Microphones of a voice-enabled device may receive audio corresponding to the user utterance and may generate corresponding audio data. The audio data may be sent from the voice-enabled device to a remote system for speech processing.

At block 704, the process 700 may include determining intent data indicating a request to send a message. For example, an ASR component may receive the audio data and may generate corresponding text data. An NLU component may receive the text data and may generate corresponding intent data. Using the example provided above, the intent data may indicate a "messaging" intent or otherwise to send message data to a recipient device.

At block 706, the process 700 may include determining whether the device from which the audio data was received is of a type without a speaker or an audio-output transducer. For example, the remote system may determine that the voice-enabled device is of a type that does not include audio-output functionality, such as a speaker. Based at least in part on determining that the voice-enabled device is of the type, the remote system may determine whether one or more prerequisites are associated with sending a message. In examples, the prerequisites may include determining whether messaging is enabled on the voice-enabled device, whether the voice-enabled device is wirelessly connected to an auxiliary device with a speaker or an audio-output transducer, and/or whether the auxiliary device is connected to the first voice-enabled device via a wired connection.

If the device is of the type without a speaker or an audio-output transducer, then at block 708, the process 700 may include determining whether an auxiliary device having a speaker or an audio-output transducer is connected to the voice-enabled device via wired connection. The remote system may send request data to the voice-enabled device representing a query to determine whether one or more of the prerequisites have been met and/or otherwise to acquire a status of the voice-enabled device. The voice-enabled device, based at least in part on receiving the request data, may identify, determine, and/or generate status data indicating a current status of the voice-enabled device. For example, the status data may indicate that messaging is enabled for the voice-enabled device and that an auxiliary device is connected to the voice-enabled device via wired connection.

If the auxiliary device is connected to the voice-enabled device via wired connection, then at block 710, the process 700 may include sending a notification of the message to a recipient device. In this example, the remote system may receive the status data from the voice-enabled device and, based at least in part on determining that messaging is enabled and/or that the auxiliary device is connected to the voice-enabled device, may send notification data to the recipient device indicating that a message has been received. In examples, the notification data may cause a light element of the recipient device to emit a light indicating there is an incoming message. Additionally, or alternatively, the notification data may cause the recipient device to output audio representing a notification that a message is incoming.

If the auxiliary device is not connected to the voice-enabled device via wired connection, then at block 712, the process 700 may include determining whether the voice-enabled device is wirelessly connected to the auxiliary device. The status data received from the voice-enabled device may indicate whether the voice-enabled device is wirelessly connected to the auxiliary device.

If the voice-enabled device is wirelessly connected to the auxiliary device, then the process 700 may continue to block 710, where a notification of the message may be sent to the recipient device, as described above.

If the voice-enabled device is not wirelessly connected to the auxiliary device, then at block 714, the process 700 may include sending light data to the voice-enabled device. The light data may cause a light element of the device to emit light indicating that the request to send a message was not successful.

It should be appreciated that outbound messaging as described with respect to FIG. 7 may be performed to ensure privacy concerns are eliminated. For example, by performing the operations described with respect to FIG. 7, the system may determine that sufficient notification means are present to send notifications and/or alerts to user devices for when audio data is and/or is not transmitted between devices.

Figure 8:
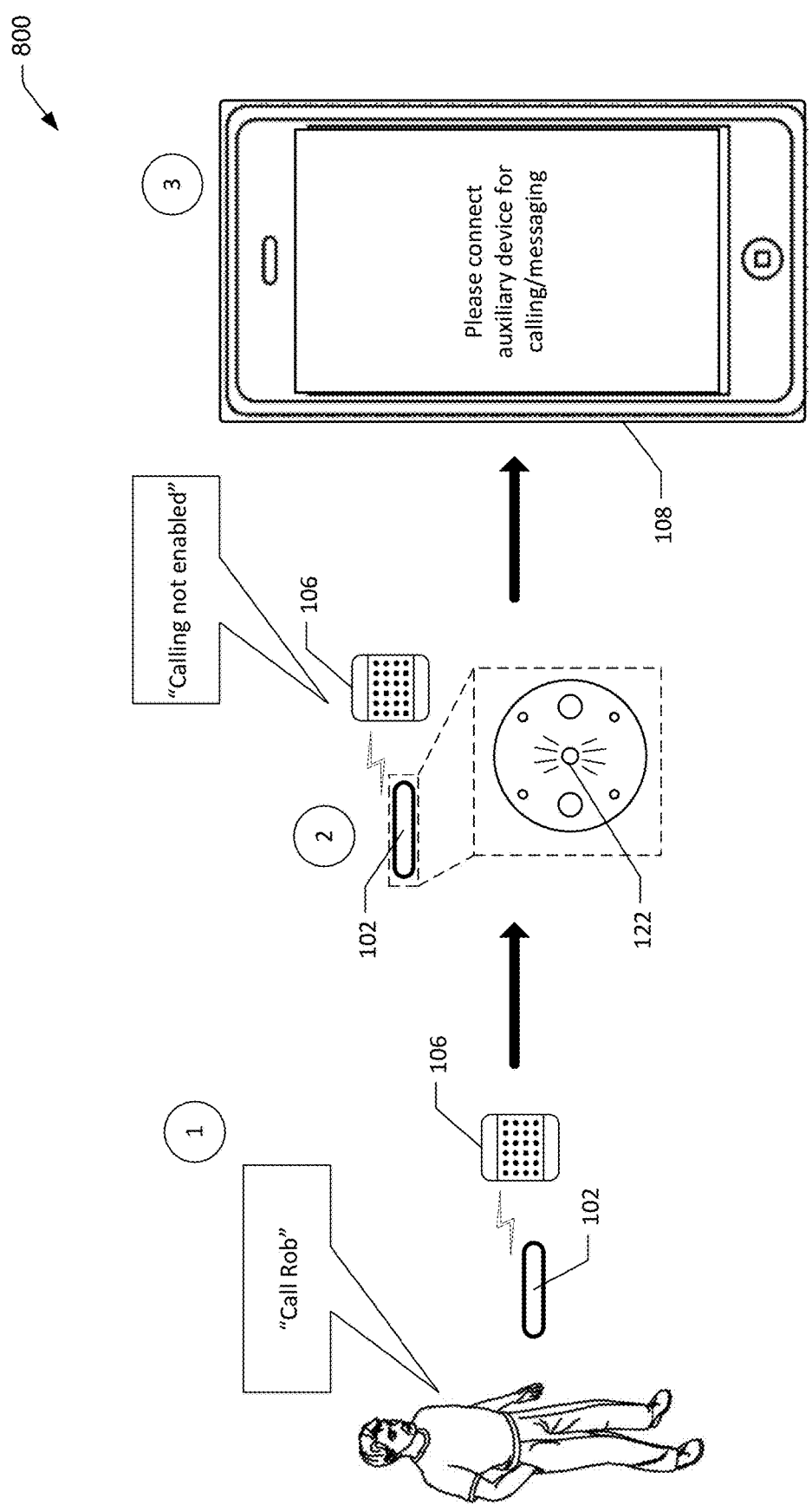
FIG. 8 illustrates a conceptual diagram of processes for generating and sending an alert to a mobile device when communications are determined to be unavailable.

FIG. 8 illustrates a conceptual diagram of processes for generating and sending an alert to a mobile device when communications are determined to be unavailable. FIG. 8 illustrates a progression, from left to right, of user interactions with a voice-enabled device and presentation of alerts and/or information by the voice-enabled device and/or a mobile device associated with the voice-enabled device.

For example, at step 1, a user may speak a user utterance. Audio corresponding to the user utterance may be captured by microphones of the voice-enabled device 102 and corresponding audio data may be generated. The audio data may be sent from the voice-enabled device 102 to a remote system for speech processing. In this example, the remote system may determine that the user utterance corresponds to "Call Rob's Home," and may determine intent data indicating a "call" intent with the recipient device(s) associated with an account identifier of "Rob's Home." In the example of FIG. 8, the remote system may determine if the voice-enabled device 102 includes a speaker or an audio-output transducer, and if not, may determine one or more prerequisites to initiate a call as requested. Here, the voice-enabled device 102 does not include a speaker or an audio-output transducer, and the prerequisites may include that calling is enabled for the voice-enabled device 102 and that the voice-enabled device 102 is connected to an auxiliary device 106 via wired connection. Request data requesting a current status of the voice-enabled device 102 may be sent from the remote system, and status data indicating the current status of the voice-enabled device 102 may be received by the remote system. Here, the status data may indicate that calling is enabled, but that the voice-enabled device is not connected to the auxiliary device 106 via wired connection. However, the status data may indicate that the voice-enabled device 102 is wirelessly connected to the auxiliary device 106.

In these examples, the remote system may determine that a communication channel is not to be established based at least in part on the status data indicating that the voice-enabled device 102 is not connected to the auxiliary device 106 via wired connection. At step 2, notification data may be sent to the voice-enabled device 102 to provide an indication that the requested call will not be initiated. The notification data may be and/or include, for example, light data that may cause a light element of the voice-enabled device 102 to emit light of a color and/or intensity indicating that the requested call will not be initiated. Additionally, or alternatively, the notification data may be and/or include audio data. The voice-enabled device 102 may send the audio data to the auxiliary device 106 given that the two devices are wirelessly connected. The auxiliary device 106 may output audio corresponding to the audio data, where the audio may provide an audible notification that the requested call will not be initiated. In these examples, an instruction may be output requesting that the auxiliary device 106 be physically plugged into the voice-enabled device 102 to initiate a call.

At step 3, the remote system may send notification data to a mobile device 108 associated with the voice-enabled device 102. The notification data may be and/or include text data. Corresponding text may be displayed on a display of the mobile device 108 indicating that the requested call will not be initiated and/or that the auxiliary device 106 is to be physically plugged into the voice-enabled device 102 to initiate a call.

Figure 9:
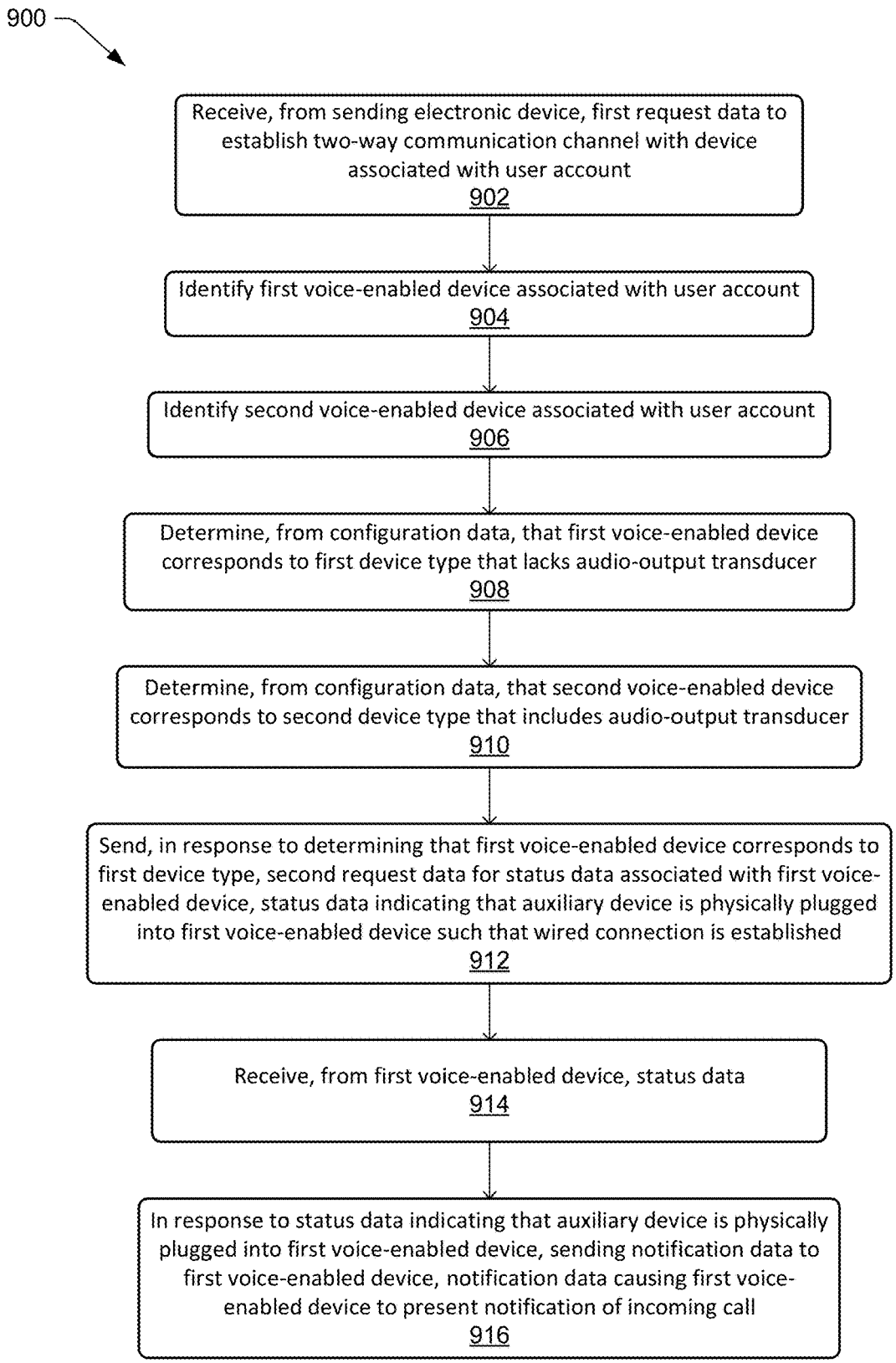
FIG. 9 illustrates a flow diagram of an example process for voice-enabled communication configurations.

FIG. 9 illustrates a flow diagram of an example process 900 for voice-enabled communication configurations. The order in which the operations or steps are described is not intended to be construed as a limitation, and any number of the described operations may be combined in any order and/or in parallel to implement process 900.

At block 902, the process 900 may include receiving, from a sending electronic device, first request data to establish a two-way communication channel with a device associated with a user account. A device, such as a voice-enabled device may have requested to place a call and/or establish a communication channel with one or more devices associated with a given user account and/or account identifier.

At block 904, the process 900 may include identifying a first voice-enabled device associated with the user account. For example, a user registry of the remote system may store data indicating, for a given user account, devices associated with the user account. The devices may include voice-enabled devices, auxiliary devices, and/or mobile devices, for example.

At block 906, the process 900 may include identifying a second voice-enabled device associated with the user account. Identification of the second voice-enabled device may be performed in the same or a similar manner as described with respect to block 902.

At block 908, the process 900 may include determining, from configuration data, that the first voice-enabled device corresponds to a first device type that lacks an audio-output transducer. The first device type may also indicate that the first voice-enabled device is configured for a wired connection to an auxiliary device including an audio-output transducer. Based at least in part on determining that the first voice-enabled device is of the first type, the remote system may determine whether one or more prerequisites are associated with establishing a communication channel with the first voice-enabled device. In examples, the prerequisites may include determining whether calling is enabled on the first voice-enabled device, whether the first voice-enabled device is wirelessly connected to an auxiliary device with a speaker or an audio-output transducer, and/or whether the auxiliary device is connected to the first voice-enabled device via a wired connection.

At block 910, the process 900 may include determining, from the configuration data, that the second voice-enabled device corresponds to a second device type configured with the audio-output transducer. For example, the remote system may determine that the second voice-enabled device is of the second device type and may determine that prerequisites and/or the same prerequisites are not associated with the second device type.

At block 912, the process 900 may include sending, in response to determining that the first voice-enabled device corresponds to the first device type, second request data for status data associated with the first voice-enabled device. The status data may indicate that the auxiliary device is physically plugged into the first voice-enabled device such that the wired connection is established. The remote system may send request data to the first voice-enabled device representing a query to determine whether one or more of the prerequisites have been met and/or otherwise to acquire status data associated with the first voice-enabled device.

At block 914, the process 900 may include receiving, from the first voice-enabled device, the status data indicating that the auxiliary device is physically plugged into the first voice-enabled device. For example, the first voice-enabled device, based at least in part on receiving the request data, may identify, determine, and/or generate status data indicating a current status of the first voice-enabled device. For example, the status data may indicate that calling is enabled for the first voice-enabled device and that an auxiliary device is connected to the first voice-enabled device via wired connection.

At block 916, the process 900 may include in response to the status data indicating that the auxiliary device is physically plugged into the first voice-enabled device, sending notification data to the first voice-enabled device, the notification data causing the first voice-enabled device to present a notification of an incoming call. In this example, the remote system may receive the status data from the first voice-enabled device and, based at least in part on determining that calling is enabled and/or that the auxiliary device is connected to the first voice-enabled device via wired connection, may send notification data to the first voice-enabled device indicating that a call is incoming. In examples, the notification data may cause a light element of the first voice-enabled device to emit a light indicating there is an incoming call. Additionally, or alternatively, the notification data may cause the auxiliary device to output audio representing a notification that a call is incoming.

Additionally, or alternatively, the process 900 may include in response to determining that the second voice-enabled device corresponds to the second device type, sending the notification data to the second voice-enabled device. In this example, given that the second voice-enabled device is of the second device type that including a speaker or an audio-output transducer, the remote system may determine that calling is enabled for the second voice-enabled device and may send the notification data based at least in part on that determination.

Additionally, or alternatively, the process 900 may include receiving third request data to send audio data representing a message to the device associated with the user account. The process 900 may also include sending, in response to determining that the first voice-enabled device corresponds to the first device type, fourth request data for second status data associated with the first voice-enabled device. The second status data may include an indication that the auxiliary device is wirelessly paired to the first voice-enabled device. The process 900 may also include receiving, from the first voice-enabled device, the second status data indicating that the auxiliary device is wirelessly paired with the first voice-enabled device. The process 900 may also include sending message data corresponding to the message to the first voice-enabled device based at least in part on the second status data indicating that the auxiliary device is wirelessly paired with the first voice-enabled device.

Additionally, or alternatively, the process 900 may include receiving, from the first voice-enabled device, an indication that the auxiliary device has been disconnected from the first voice-enabled device and causing the two-way communication channel to cease. The process 900 may also include sending, to the first voice-enabled device, lighting data configured to cause a light element of the first voice-enabled device to emit light indicating the two-way communication channel has ceased.

Additionally, or alternatively, the process 900 may include receiving, from the first voice-enabled device, audio data representing a user utterance and determining, based at least in part on the audio data, intent data indicating a request to establish a second two-way communication channel between the first voice-enabled device and a recipient device. The process 900 may also include sending, based at least in part on determining that the first voice-enabled device corresponds to the first device type, third request data for second status data associated with the first voice-enabled device. The process 900 may also include receiving, from the first voice-enabled device, the second status data indicating that the auxiliary device is physically plugged into the first voice-enabled device. Based at least in part on the second status data indicating that the auxiliary device is physically plugged into the first voice-enabled device, sending fourth request data to establish the second two-way communication channel to the recipient device.

Figure 10:
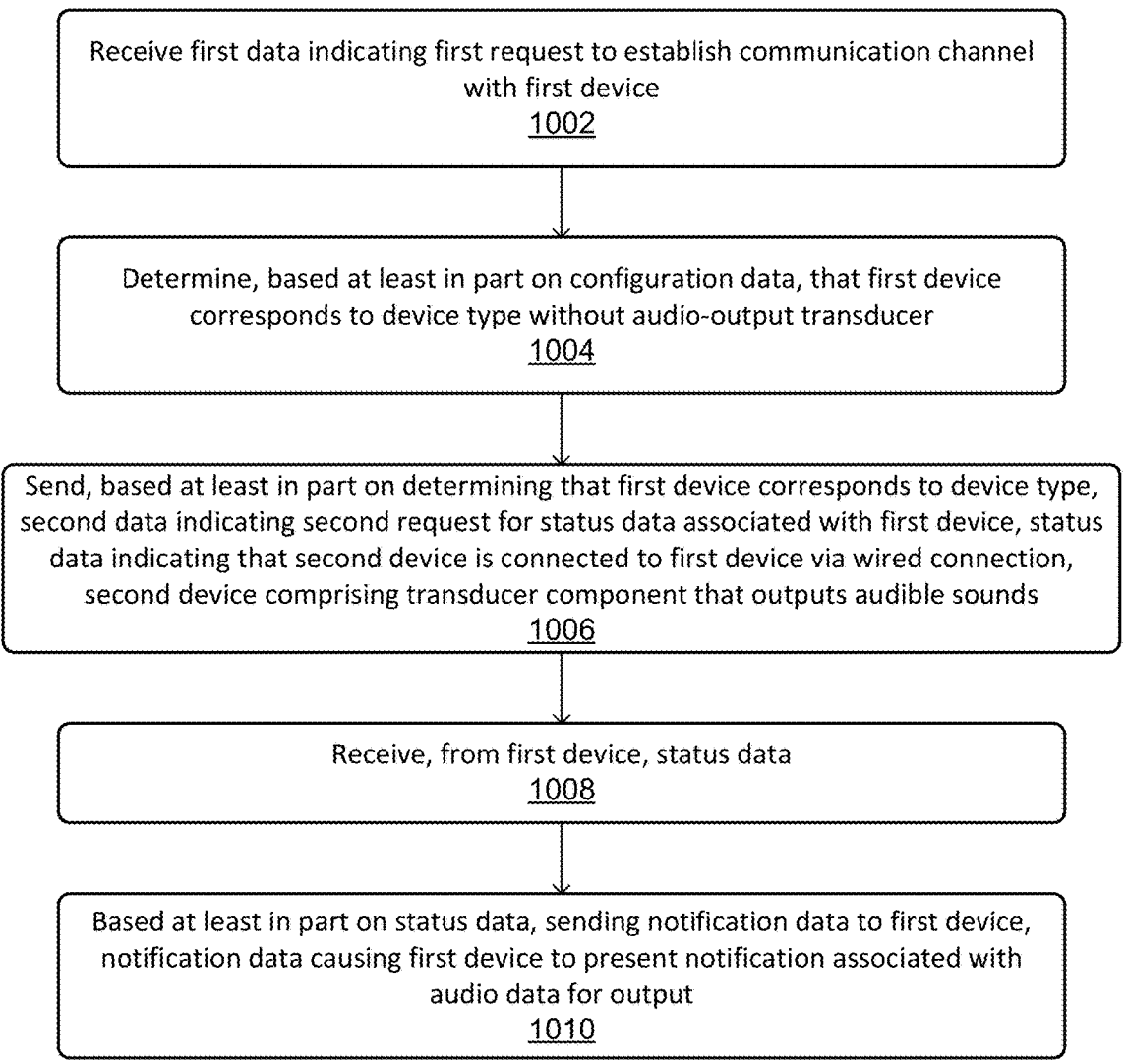
FIG. 10 illustrates a flow diagram of another example process for voice-enabled communication configurations.

FIG. 10 illustrates a flow diagram of another example process 1000 for voice-enabled communication configurations. The order in which the operations or steps are described is not intended to be construed as a limitation, and any number of the described operations may be combined in any order and/or in parallel to implement process 1000.

At block 1002, the process 1000 may include receiving first data indicating a first request to establish a communication channel with a first device. A device, such as a voice-enabled device may have requested to place a call and/or establish a communication channel with one or more devices associated with a given user account and/or account identifier.

At block 1004, the process 1000 may include determining, based at least in part on configuration data, that the first device corresponds to a device type without a speaker or an audio-output transducer. Based at least in part on determining that the first device, also described herein as a first voice-enabled device is of the first type, the remote system may determine whether one or more prerequisites are associated with establishing a communication channel with the first voice-enabled device. In examples, the prerequisites may include determining whether calling is enabled on the first voice-enabled device, whether the first voice-enabled device is wirelessly connected to an auxiliary device with a speaker or an audio-output transducer, and/or whether the auxiliary device is connected to the first voice-enabled device via a wired connection.

At block 1006, the process 1000 may include sending, based at least in part on determining that the first device corresponds to the device type, second data indicating a second request for status data associated with the first device, the status data indicating that a second device, also described herein as an auxiliary device, is connected to the first device via wired connection. In these examples, the second device may comprise a traducer component that outputs audible sounds. The remote system may send request data to the first voice-enabled device representing a query to determine whether one or more of the prerequisites have been met and/or otherwise to acquire a status of the first voice-enabled device.

At block 1008, the process 1000 may include receiving, from the first device, the status data. For example, the first voice-enabled device, based at least in part on receiving the request data, may identify, determine, and/or generate status data indicating a current status of the first voice-enabled device. For example, the status data may indicate that calling is enabled for the first voice-enabled device and that the second device is connected to the first voice-enabled device via wired connection.

At block 1010, the process 1000 may include, based at least in part on the status data, sending notification data to the first device, the notification data causing the first device to present a notification associated with audio data for output. In examples, the notification data may cause a light element of the first voice-enabled device to emit a light indicating there is an incoming call. Additionally, or alternatively, the notification data may cause the second device to output audio representing a notification that a call is incoming. It should be appreciated that communications that have audio data may include one or more types of communications, such as, for example, audio messages, voicemail messages, synchronous communications such as telephone calls, Voice-over-Internal-Protocol calls, and/or any other type of communication that involves and/or includes audio data.

Additionally, or alternatively, the process 1000 may include receiving third data indicating a third request to send audio data representing a message to the first device associated with the user account. The process 1000 may also include sending, based at least in part on determining that the first voice-enabled device corresponds to the first device type, fourth request data representing a fourth request for second status data associated with the first voice-enabled device. The second status data may include an indication that the second device is wirelessly connected to the first voice-enabled device. The process 1000 may also include receiving, from the first voice-enabled device, the second status data indicating that the second device is wirelessly connected to the first voice-enabled device. The process 1000 may also include sending message data corresponding to the message to the first voice-enabled device based at least in part on the second status data indicating that the second device is wirelessly connected to the first voice-enabled device.

Additionally, or alternatively, the process 1000 may include receiving, from the first voice-enabled device, an indication that the second device has been disconnected from the first voice-enabled device and causing the communication channel to cease. The process 1000 may also include sending, to the first voice-enabled device, lighting data configured to cause a light element of the first voice-enabled device to emit light indicating the communication channel has ceased.

Additionally, or alternatively, the process 1000 may include receiving, from the first voice-enabled device, audio data representing a user utterance and determining, based at least in part on the audio data, intent data indicating a request to establish a second communication channel between the first voice-enabled device and a recipient device. The process 1000 may also include determining second status data indicating that the second device is physically plugged into the first voice-enabled device. For example, the status data may be sent, such as in the form of metadata, along with the audio data. For example, the status data may be sent in an MP3 ID3 container and/or any other suitable method that may be used to deliver metadata with audio data. In other examples, the status data may not accompany the audio data, and in these examples, request data representing a request for status data may be sent to the first device. The first device may generate the status data in response to the request data and the status data may be received at the remote system from the first device. Based at least in part on the second status data indicating that the second device is physically plugged into the first voice-enabled device, the process 1000 may include sending fourth request data to establish the second communication channel to the recipient device.

Additionally, or alternatively, the process 1000 may include receiving third data requesting establishment of a second communication channel with the first device and sending, based at least in part on determining that the first device corresponds to the device type, fourth data requesting second status data associated with the first device, the second status data indicating that a wired connection between the second device and the first device is absent and the second device is wirelessly connected to the first device. The process 1000 may also include receiving, from the first device, the second status data and, based at least in part on the second status data, sending audio data to the first device.

The audio data may represent a message indicating that the wired connection is to be established before the communication channel is established.

Additionally, or alternatively, the process 1000 may include receiving, from the device, audio data representing a user utterance and determining, based at least in part on the audio data, intent data requesting sending of audio data representing a message to a recipient device. The process 1000 may also include sending, based at least in part on determining that the first device corresponds to the device type, third data requesting second status data associated with the first device. The second status data may indicate that the second device is wirelessly connected to the first device. The process 1000 may also include receiving, from the first device, the second status data indicating that the second device is wirelessly connected to the first device and, based at least in part on the second status data, sending the second audio data corresponding to the message to the recipient device.

Additionally, or alternatively, the process 1000 may include receiving, from the first device, an indication that the second device has been powered off and/or has transitioned to a sleep mode. The process 100 may also include causing, based at least in part on the indication, the communication channel to cease and sending, to the first device, lighting data configured to cause a light element of the first device to emit light indicating the communication channel has ceased.

Additionally, or alternatively, the process 1000 may include receiving, from the first device, audio data representing a user utterance and determining, based at least in part on the audio data, intent data indicating a third request to establish a second communication channel between the first device and a recipient device. The process 1000 may also include sending, based at least in part on determining that the first device corresponds to the device type, third data requesting second status data associated with the first device. The process 1000 may also include receiving, from the first device, the second status data indicating that the second device is disconnected from the first device and that a wireless connection between the second device and the first device is absent. The process 1000 may also include generating, based at least in part on the second status data, alert data including a notification that the first device is disconnected from the second device. The process 1000 may also include sending the alert data to a mobile device associated with the first device.

Figure 11A:
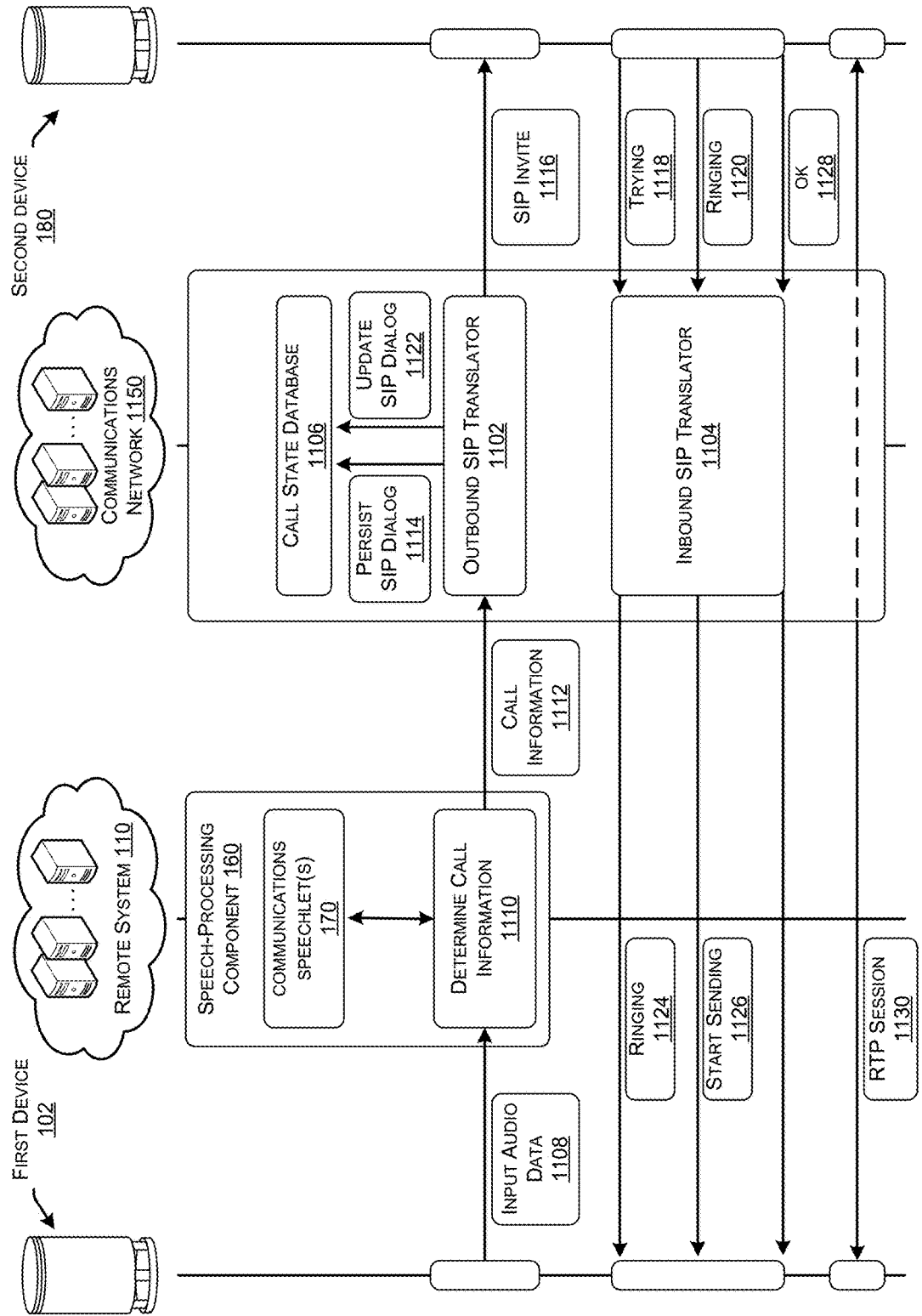
FIGS. 11A and 11B illustrate example techniques for a communications system to establish a flow of data between devices, and transitioning the flow of data to a different device.
Figure 11B:
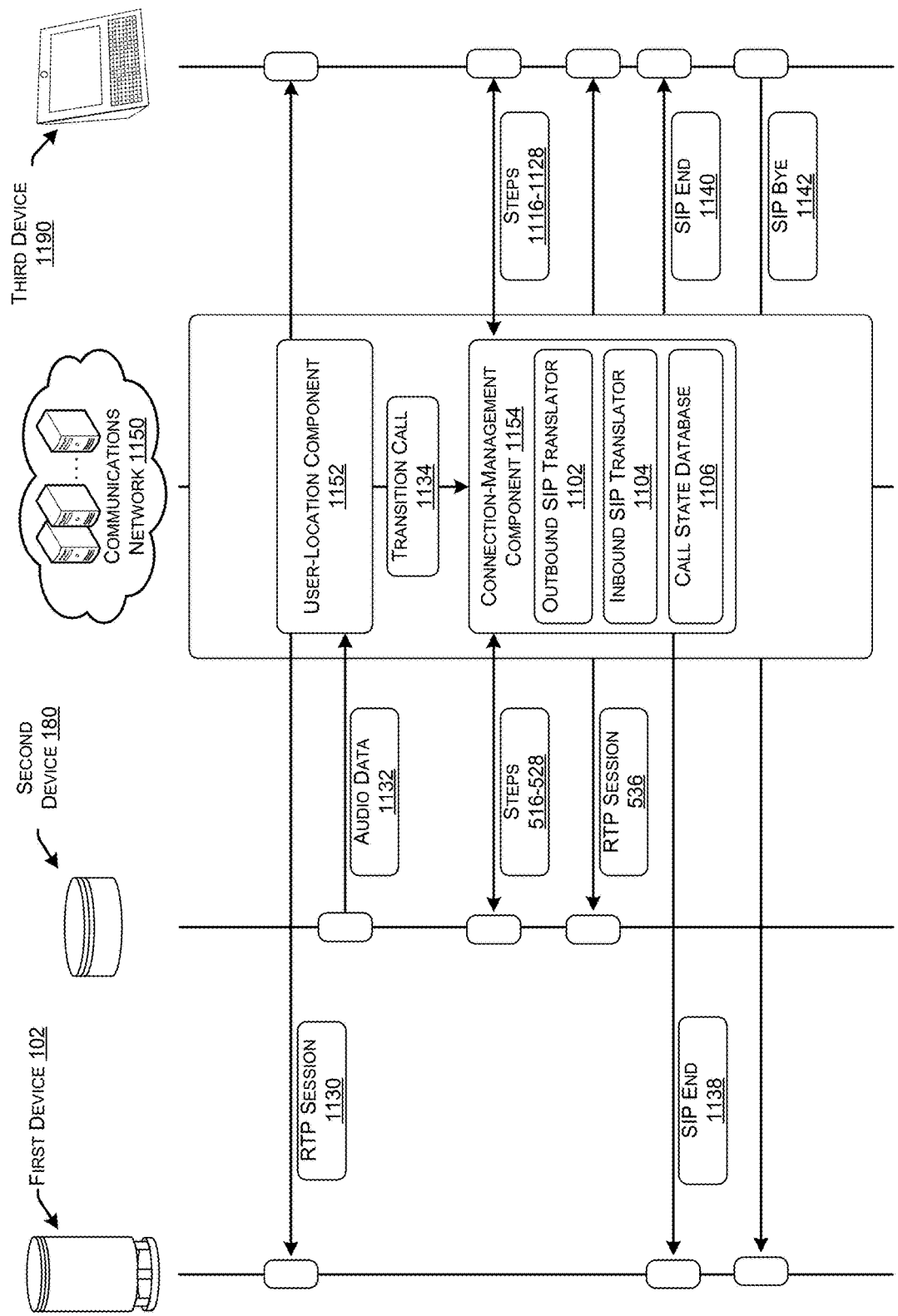

FIGS. 11A and 11B illustrate components that may be used to coordinate communications using a system, such as a communications network 1150. The components shown in FIG. 11A carry out an example process 1100 of signaling to initiate a communication channel according to the present disclosure. In one example configuration, the remote system 110 is configured to enable voice commands (e.g., perform ASR, NLU, etc. to identify a voice command included in audio data), whereas the communications network 1150 is configured to enable communication channels (e.g., using session initiation protocol (SIP)). For example, the communications network 1150 may send SIP messages to endpoints (e.g., recipient devices such as the second device 180) in order to establish a communication channel for sending and receiving audio data and/or image data. The communication channel may use network protocols such as real-time transport protocol (RTP), RTP Control Protocol (RTCP), Web Real-Time communication (WebRTC) and/or the like. For example, the communications network 1150 may send SIP messages to initiate a single RTP media stream between two endpoints (e.g., direct RTP media stream between the first device 102 and the second device 180) and/or to initiate and facilitate RTP media streams between the two endpoints (e.g., RTP media streams between the first device 102 and the communications network 1150 and between the communications network 1150 and the second device 180). During a communication channel, the communications network 1150 may initiate two media streams, with a first media stream corresponding to incoming audio data from the first device 102 to the second device 180 and a second media stream corresponding to outgoing audio data from the second device 180 to the first device 102, although for ease of explanation this may be illustrated as a single RTP media stream.

As illustrated in FIG. 11A, the communications network 1150 may include components to coordinate communications between devices, such as an outbound SIP translator, an inbound SIP translator, and a call state database 1106. As shown, the first device 102 may send, at block 1108, input audio data to the remote system 110, and the remote system 110 may determine, at block 1110, call information using the input audio data. For example, one or more communications speechlets 136 may receive an intent from the NLU component 166, and in response to an intent to perform a call, the communications speechlet(s) 170 may engage the communications network 1150, which may perform messaging and two-way communications as described herein below. The communications speechlet(s) 1150 may include hardware, software, firmware, or the like that may be dedicated for determining communication commands. The speechlet component may be part of the remote system 110 or may be located in whole (or in part) with separate speechlet server(s). The communications speechlet(s) 170 may be configured to perform one or more actions. An ability to perform such an action may sometimes be referred to as a "skill." That is, a skill of the communications speechlet(s) 170 may configure the communications speechlet(s) 170 to execute specific functionality in order to provide data or produce some other output requested by a user. The communications speechlet(s) 170 may be configured to execute at least one skill/action, such as causing the communications network 1150 to establish and maintain a communication channel.

The remote system 110 may send, at block 1112, the call information to the communications network 1150, such as via the communications speechlet(s) 170. The remote system 110 may determine the call information by performing ASR, NLU, etc., as discussed herein, and the call information may include a data source name (DSN), a number from which to call, a number to which to call, encodings, and/or additional information. For example, the remote system 110 may identify from which phone number and/or device identifier the user would like to initiate the call, to which phone number and/or device identifier the user would like to initiate the call, from which device 102 the user would like to perform the call, etc.

While FIG. 11A illustrates the remote system 110 sending the call information to the communications network 1150 in a single step, such as at block 1112, the disclosure is not limited thereto. Instead, the remote system 110 may send the call information to the first device 102 and the first device 102 may send the call information to the communications network 1150 in order to initiate the call without departing from the disclosure. Thus, the remote system 110 may not communicate directly with the communications network 1150 in step 1112, but may instead instruct the first device 102 to connect to the communications network 1150 in order to initiate the call.

The communications network 1150 may include the outbound SIP translator 1102, the inbound SIP translator 1104, and the call state database 1106. The outbound SIP translator 1102 may include logic to convert commands received from the remote system 110 into SIP requests/responses and may handle sending outgoing SIP requests and sending responses to incoming SIP requests. After receiving the call information, the outbound SIP translator 1102 may persist, at block 1114, a SIP dialog using the call state database 1106. For example, the DSN may include information such as the name, location, and driver associated with the call state database 1106 (and, in some examples, a user ID and password of the user) and the outbound SIP translator 1102 may send a SIP dialog to the call state database 1106 regarding the communication channel. The call state database 1106 may persist the call state if provided a device ID and one of a call ID or a dialog ID. The outbound SIP translator 1102 may send, at block 1116, a SIP Invite to a SIP Endpoint, such as to the second device 180, a Session Border Controller (SBC), or the like).

The inbound SIP translator 1104 may include logic to convert SIP requests/responses into commands to send to the first device 102 and/or the second device 180 and may handle receiving incoming SIP requests and incoming SIP responses. The second device 180 may send, at block 1118, a TRYING message to the inbound SIP translator 1104 and may send, at block 1120, a RINGING message to the inbound SIP translator 1134. The inbound SIP translator 1134 may update, at block 1122, the SIP dialog using the call state database 1106 and may send, at block 1124, a RINGING message to the first device 102.

When the communication channel is accepted by the second device 180, the second device 180 may send, at block 1128, an OK message to the inbound SIP translator 1104, the inbound SIP translator 1104 may send, at block 1126, a startSending message to the first device 102. The startSending message may include information associated with an internet protocol address, a port, encoding, or the like required to initiate the communication channel. Using the startSending message, the first device 102 may establish (1130) an RTP communication channel with the second device 180 via the communications network 1150. In some examples, the communications network 1150 may communicate with the first device 102 using the remote system 110 as an intermediary server.

For ease of explanation, the disclosure illustrates the system using SIP. However, the disclosure is not limited thereto and the system may use any communication protocol for signaling and/or controlling communication channels without departing from the disclosure. Similarly, while some descriptions of the communication channels refer only to audio data, the disclosure is not limited thereto and the communication channels may include audio data, video data, and/or any other multimedia data without departing from the disclosure.

FIG. 11B illustrates examples of signaling to end a communication channel according to the present disclosure. After establishing the RTP communication channel 1130 between the first device 102 and the second device 180, the second device 104 may send, at block 1132, audio data and/or other data to determine proximity of the user to the communications network 1150. A user-location component 1152 may determine to transition the call, at block 1134, from the first device 102 to the second device 180. A connection-management component 1154 may then perform one or more of operations 1116-1128 with the second device 180 and a third device 1190 to establish an RTP session, at block 1136, between the second device 180 and the third device 1190. In some examples, the connection-management component 1154 may transition some, or all, or the data being transmitted in the call from the first device 102 to the second device 180. For instance, the first device 102 may still receive audio data and/or video data from the third device 1190, may still send audio data and/or video data to the third device 1190, or may quit communicating with the third device 1190 altogether.

In examples where the connection-management component 1154 transitions all of the data being communicated to the second device 180, the RTP communication channel, at block 1130, may be ended by the connection-management component 1154. The communications network 1150 may send, at block 1140, an SIP end message to the third device 1190, and also send, at block 1138, an SIP end message to the first device 102. The outbound SIP translator 1102 may update the session using the call state database 1106 and may send, at block 1142, a SIP BYE message to the third device 1190. The remote user device may send an OK message to the inbound SIP translator 1104 and the inbound SIP translator 1104 may update the session using the call state database 1106. In some examples, the inbound SIP translator 1104 may send the OK message to the first device 102 to confirm that the communication channel has been ended. Thus, the RTP communication channel 1130 may be ended between the first device 102 and the third device 1190.

Although not illustrated, the third device 1190 may send a SIP BYE message to the inbound SIP translator 1104 and the inbound SIP translator 1104 may update the session using the call state database 1106. The inbound SIP translator 1104 may send a stopSending message to the first device 102. The first device 102 may send an End message to the outbound SIP translator 1102, the End message including a DSN. The outbound SIP translator 1102 may then update the session using the call state database 1106, and send an OK message to the third device 1190. Thus, the RTP communication channel 1130 may be ended between the first device 102 and the third device 1190.

While FIGS. 11A and 11B illustrate the RTP communication channels 1130 and 1138 being established between the first device 102 and/or the second device 180 and the third device 1190, the disclosure is not limited thereto and the RTP communication channels 1130 and 1138 may be established between the devices 102, 180 and a telephone network associated with the third device 1190 without departing from the disclosure.

FIGS. 12A and 12B illustrate example components for establishing a flow of data between devices. For instances, FIGS. 12A and 12B illustrates examples 1200 and 1208 of establishing media streams between devices according to the present disclosure. In examples, the first device 102 may have a publicly accessible IP address and may be configured to establish the RTP communication channel directly with the second device 180. To enable the first device 102 to establish the RTP communication channel, the communications network 1150 may include Session Traversal of User Datagram Protocol (UDP) Through Network Address Translators (NATs) server(s), such as STUN server(s) 1202. The STUN server(s) 1202 may be configured to allow NAT clients, such as a first device 102 behind a firewall, to setup calls to a VoIP provider hosted outside of the local network by providing a public IP address, the type of NAT they are behind, and a port identifier associated by the NAT with a particular local port. As illustrated in FIG. 12A, the first device 102 may perform, at block 1204, IP discovery using the STUN server(s) 1202 and may use this information to set up an RTP communication channel 1206, such as a UDP communication, between the first device 102 and the second device 180 to establish a call.

In some examples, the first device 102 may not have a publicly accessible IP address. For example, in some types of NAT the first device 102 cannot route outside of the local network. To enable the first device 102 to establish an RTP communication channel, the communications network 1150 may include Traversal Using relays around NAT (TURN) server(s) 1210. The TURN server(s) 1210 may be configured to connect the first device 102 to the second device 180 when the first device 102 is behind a NAT. As illustrated in FIG. 12B, the first device 102 may establish, at block 1212, an RTP session with the TURN server(s) 1210 and the TURN server(s) 1210 may establish, at block 1214, an RTP session with the second device 180. Thus, the first device 102 may communicate with the second device 180 via the TURN server(s) 1210. For example, the first device 102 may send outgoing audio data to the communications network 1150 and the communications network 1150 may send the outgoing audio data to the second device 180. Similarly, the second device 180 may send incoming audio/video data to the communications network 1150 and the communications network 1150 may send the incoming data to the first device 102.

In some examples, the communications network 1150 may establish communication channels using a combination of the STUN server(s) 1202 and the TURN server(s) 1210. For example, a communication channel may be more easily established/configured using the TURN server(s) 1210, but may benefit from latency improvements using the STUN server(s) 1202. Thus, the system may use the STUN server(s) 1202 when the communication channel may be routed directly between two devices and may use the TURN server(s) 1210 for all other communication channels. Additionally, or alternatively, the system may use the STUN server(s) 1202 and/or the TURN server(s) 1210 selectively based on the communication channel being established. For example, the system may use the STUN server(s) 1202 when establishing a communication channel between two devices (e.g., point-to-point) within a single network (e.g., corporate LAN and/or WLAN), but may use the TURN server(s) 1210 when establishing a communication channel between two devices on separate networks and/or three or more devices regardless of network(s). When the communication channel goes from only two devices to three or more devices, the system may need to transition from the STUN server(s) 1202 to the TURN server(s) 1210. Thus, if the system anticipates three or more devices being included in the communication channel, the communication channel may be performed using the TURN server(s) 1210.

Figure 13:
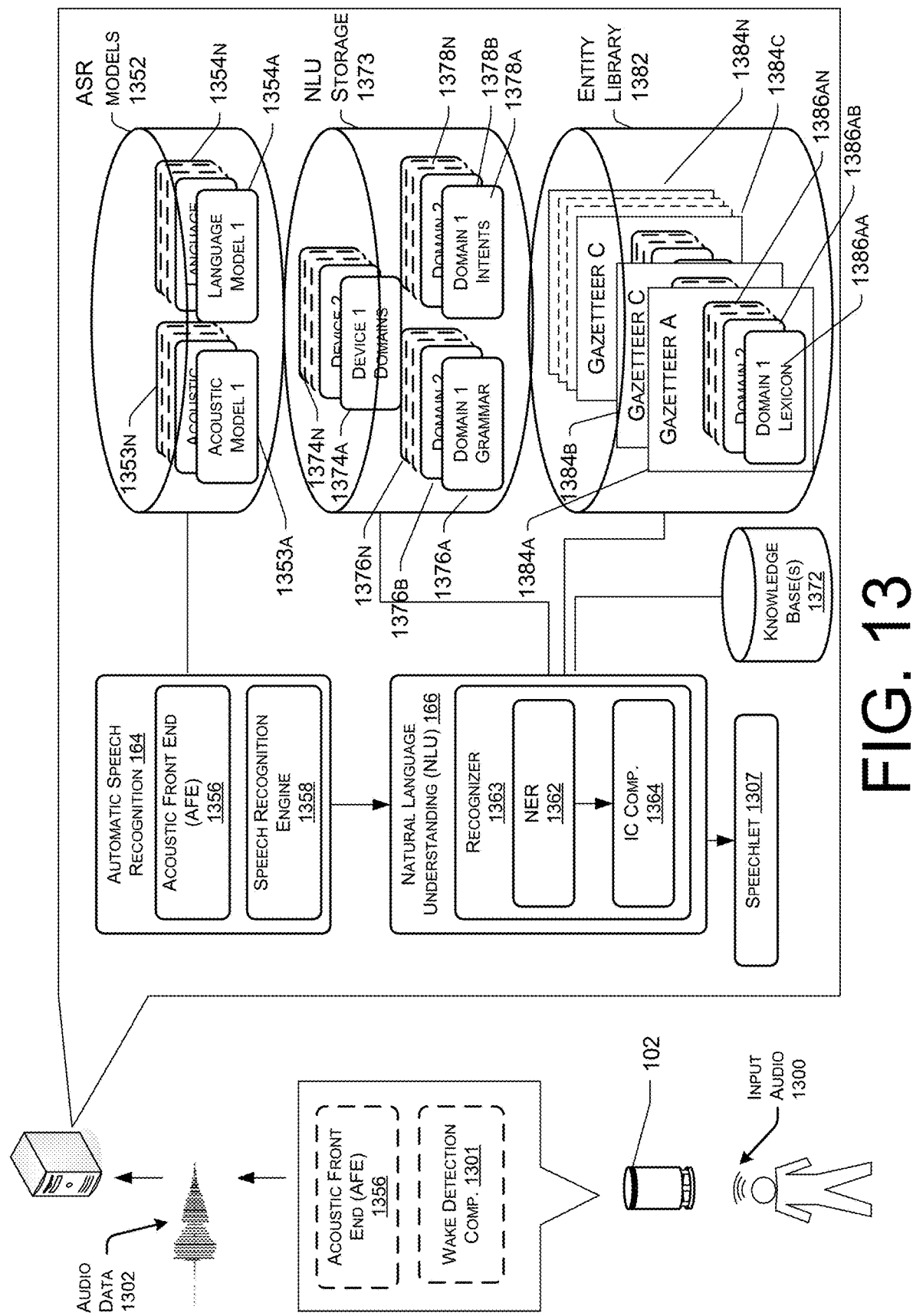
FIG. 13 illustrates a conceptual diagram of components of a speech-processing system for processing audio data provided by one or more devices.

FIG. 13 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 110). The various components illustrated may be located on a same or different physical devices. Message between various components illustrated in FIG. 13 may occur directly or across a network 112. An audio capture component, such as a microphone 120 of the device 102, or another device, captures audio 1300 corresponding to a spoken utterance. The device 102, using a wake-word component 1301, then processes audio data corresponding to the audio 1300 to determine if a keyword (such as a wakeword) is detected in the audio data. Following detection of a wakeword, the device 102 sends audio data 1302 corresponding to the utterance to the remote system 110 that includes an ASR component 164. The audio data 1302 may be output from an optional acoustic front end (AFE) 1356 located on the device prior to transmission. In other instances, the audio data 1302 may be in a different form for processing by a remote AFE 1356, such as the AFE 1356 located with the ASR component 164 of the remote system 110.

The wake-word component 1301 works in conjunction with other components of the user device, for example a microphone to detect keywords in audio 1300. For example, the device may convert audio 1300 into audio data, and process the audio data with the wake-word component 1301 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 1301 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wake-word component 1301 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 1302 corresponding to input audio 1300 to the remote system 110 for speech processing. Audio data corresponding to that audio may be sent to remote system 110 for routing to a recipient device or may be sent to the remote system 110 for speech processing for interpretation of the included speech (either for purposes of enabling voice-messages and/or for purposes of executing a command in the speech). The audio data 1302 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 110, an ASR component 164 may convert the audio data 1302 into text. The ASR transcribes audio data into text data representing the words of the speech contained in the audio data 1302. The text data may then be used by other components for various purposes, such as executing system commands, inputting data, etc. A spoken utterance in the audio data is input to a processor configured to perform ASR which then interprets the utterance based on the similarity between the utterance and pre-established language models 1354 stored in an ASR model knowledge base (ASR Models Storage 1352). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1353 stored in an ASR Models Storage 1352), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 164 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1356 and a speech recognition engine 1358. The acoustic front end (AFE) 1356 transforms the audio data from the microphone into data for processing by the speech recognition engine 1358. The speech recognition engine 1358 compares the speech recognition data with acoustic models 1353, language models 1354, and other data models and information for recognizing the speech conveyed in the audio data. The AFE 1356 may reduce noise in the audio data and divide the digitized audio data into frames representing time intervals for which the AFE 1356 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1358 may process the output from the AFE 1356 with reference to information stored in speech/model storage (1352). Alternatively, post front-end processed data (such as feature vectors) may be received by the device executing ASR processing from another source besides the internal AFE. For example, the user device may process audio data into feature vectors (for example using an on-device AFE 1356) and transmit that information to a server across a network for ASR processing. Feature vectors may arrive at the remote system 110 encoded, in which case they may be decoded prior to processing by the processor executing the speech recognition engine 1358.

The speech recognition engine 1358 attempts to match received feature vectors to language phonemes and words as known in the stored acoustic models 1353 and language models 1354. The speech recognition engine 1358 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, call Rob's Home." The wake detection component may identify the wake word, otherwise described as a trigger expression, "Alexa," in the user utterance and may "wake" based on identifying the wake word. Audio data corresponding to the user utterance may be sent to the remote system 110, where the speech recognition engine 1358 may identify, determine, and/or generate text data corresponding to the user utterance, here "Rob's home."

The speech recognition engine 1358 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1358 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 110, for natural language understanding (NLU) processing, such as conversion of the text into commands for execution, either by the user device, by the remote system 110, or by another device (such as a server running a specific application like a search engine, etc.).

The device performing NLU processing 148 (e.g., server 110) may include various components, including potentially dedicated processor(s), memory, storage, etc. As shown in FIG. 13, an NLU component 166 may include a recognizer 1363 that includes a named entity recognition (NER) component 1362 which is used to identify portions of query text that correspond to a named entity that may be recognizable by the system. A downstream process called named entity resolution links a text portion to a specific entity known to the system. To perform named entity resolution, the system may utilize gazetteer information (1384*a*-1384*n*) stored in entity library storage 1382. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 164 based on the utterance input audio 1300) and attempts to make a semantic interpretation of the text. That is, the NLU process determines the meaning behind the text based on the individual words and then implements that meaning. NLU processing 166 interprets a text string to derive an intent or a desired action from the user as well as the pertinent pieces of information in the text that allow a device (e.g., device 102) to complete that action. For example, if a spoken utterance is processed using ASR 164 and outputs the text "call Rob's Home" the NLU process may determine that the user intended to establish a communication channel with one or more devices associated with a user account with the identifier of "Rob's Home."

The NLU may process several textual inputs related to the same utterance. For example, if the ASR 164 outputs N text segments (as part of an N-best list), the NLU may process all N outputs to obtain NLU results.

As will be discussed further below, the NLU process may be configured to parse and tag to annotate text as part of NLU processing. For example, for the text "call Rob's Home," "call" may be tagged as a command (to establish a communication channel) and "Rob's Home" may be tagged as the naming identifier of the user account associated with one or more devices to establish the communication channel with.

To correctly perform NLU processing of speech input, an NLU process 166 may be configured to determine a "domain" of the utterance so as to determine and narrow down which services offered by the endpoint device (e.g., remote system 110 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1362 receives a query in the form of ASR results and attempts to identify relevant grammars and lexical information that may be used to construe meaning. To do so, the NLU component 166 may begin by identifying potential domains that may relate to the received query. The NLU storage 1373 includes a database of devices (1374*a*-1374*n*) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 1363, language model and/or grammar database (1376*a*-1376*n*), a particular set of intents/actions (1378*a*-1378*n*), and a particular personalized lexicon (1386). Each gazetteer (1384*a*-1384*n*) may include domain-indexed lexical information associated with a particular user and/or device. For example, the Gazetteer A (1384*a*) includes domain-index lexical information 1386*aa* to 1386*an*. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1364 parses the query to determine an intent or intents for each identified domain, where the intent corresponds to the action to be performed that is responsive to the query. Each domain is associated with a database (1378*a*-1378*n*) of words linked to intents. For example, a communications intent database may link words and phrases such as "call," "initiate call," "communicate," to a "call" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1364 identifies potential intents for each identified domain by comparing words in the query to the words and phrases in the intents database 1378. In some instances, the determination of an intent by the IC component 1364 is performed using a set of rules or templates that are processed against the incoming text to identify a matching intent.

In order to generate a particular interpreted response, the NER 1362 applies the grammar models and lexical information associated with the respective domain to actually recognize a mention of one or more entities in the text of the query. In this manner, the NER 1362 identifies "slots" or values (i.e., particular words in query text) that may be needed for later command processing. Depending on the complexity of the NER 1362, it may also label each slot with a type of varying levels of specificity (such as noun, place, device name, device location, city, artist name, song name, amount of time, timer number, or the like). Each grammar model 1376 includes the names of entities (i.e., nouns) commonly found in speech about the particular domain (i.e., generic terms), whereas the lexical information 1386 from the gazetteer 1384 is personalized to the user(s) and/or the device. For instance, a grammar model associated with the shopping domain may include a database of words commonly used when people discuss shopping.

The intents identified by the IC component 1364 are linked to domain-specific grammar frameworks (included in 1376) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "call" is an identified intent, a grammar (1376) framework or frameworks may correspond to sentence structures such as "call {Rob's Home} user account."

For example, the NER component 1362 may parse the query to identify words as subject, object, verb, preposition, etc., based on grammar rules and/or models, prior to recognizing named entities. The identified verb may be used by the IC component 1364 to identify intent, which is then used by the NER component 1362 to identify frameworks. A framework for the intent of "play a song," meanwhile, may specify a list of slots/fields applicable to play the identified "song" and any object modifier (e.g., specifying a music collection from which the song should be accessed) or the like. The NER component 1362 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1362 may search the database of generic words associated with the domain (in the knowledge base 1372). So, for instance, if the query was "call Rob's Home," after failing to determine which user account to initiate a communication channel with, the NER component 1362 may search the domain vocabulary for the phrase "Rob's Home". In the alternative, generic words may be checked before the gazetteer information, or both may be tried, potentially producing two different results.

The output data from the NLU processing (which may include tagged text, commands, etc.) may then be sent to a speechlet 170. The destination speechlet 170 may be determined based on the NLU output. For example, if the NLU output includes a command to send a message, the destination speechlet 170 may be a message sending application, such as one located on the user device or in a message sending appliance, configured to execute a message sending command. If the NLU output includes a search request, the destination speechlet 170 may include a search engine processor, such as one located on a search server, configured to execute a search command. After the appropriate command is generated based on the intent of the user, the speechlet 170 may provide some or all of this information to a text-to-speech (TTS) engine. The TTS engine may then generate an actual audio file for outputting the audio data determined by the speechlet 170 (e.g., "okay," or "connecting to Rob's Home"). After generating the file (or "audio data"), the TTS engine may provide this data back to the remote system 110.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 166 during runtime operations where NLU operations are performed on text (such as text output from an ASR component 164). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1363. Each recognizer may include various NLU components such as an NER component 1362, IC component 1364 and other components such as an entity resolver, or other components.

For example, a messaging domain recognizer 1363-A (Domain A) may have an NER component 1362-A that identifies what slots (i.e., portions of input text) may correspond to particular words relevant to that domain. The words may correspond to entities such as (for the messaging domain) a recipient. An NER component 1362 may use a machine learning model, such as a domain specific conditional random field (CRF) to both identify the portions corresponding to an entity as well as identify what type of entity corresponds to the text portion. The messaging domain recognizer 1363-A may also have its own intent classification (IC) component 1364-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 110 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 110, as illustrated herein are exemplary, and may be located in a stand-alone device or may be included, in whole or in part, as a component of a larger device or system, may be distributed across a network or multiple devices connected by a network, etc.

Figure 14:
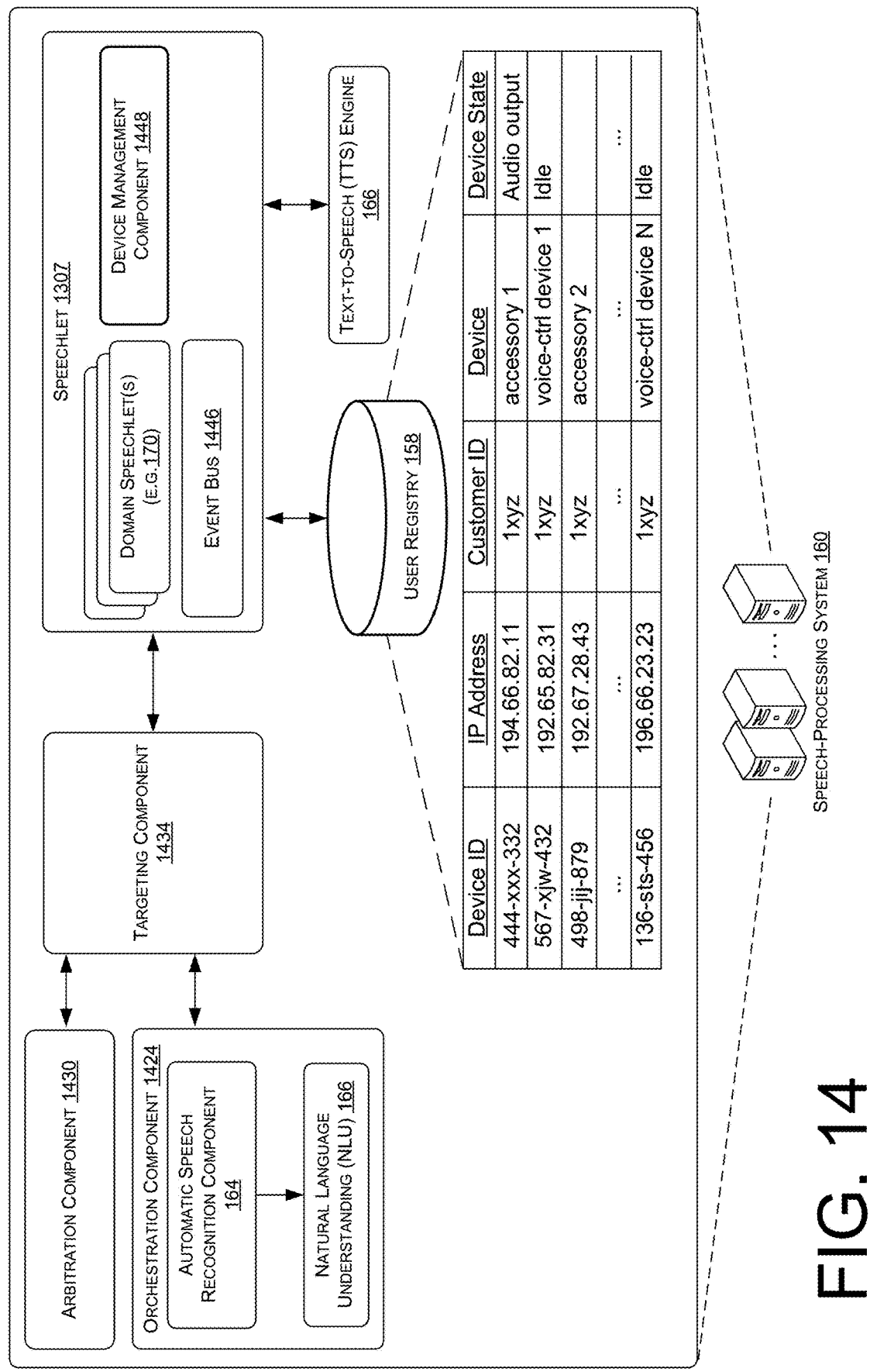
FIG. 14 illustrates a conceptual diagram of components of a speech-processing system for voice-enabled communication configurations.

FIG. 14 illustrates a conceptual diagram of components of a speech-processing system 160 associating audio output commands with multiple devices, including a speechlet 170 configured to generate a command that the selected voice-enabled device uses to respond to a user utterance. As used with respect to FIG. 14, a voice-enabled device may include a voice-enabled device 102, such as described with respect to FIG. 1. As illustrated in FIG. 14, the speech-processing system 160, including the orchestration component 1424 comprising the ASR component 164 and the NLU component 166, may be coupled to the targeting component 1434 and provide the targeting component 1434 with the intent determined to be expressed in the user utterance. Further, the arbitration component 1430 may provide the ranked list of devices to the targeting component 1434, as well as device indicators (e.g., IP addresses, devices names, etc.) for one or more of the voice-enabled devices in the ranked list of devices. The targeting component 1434 may then perform techniques to determine a target device (e.g., a device to perform the requested operation), and provide various data to the speechlet 1307. For instance, the targeting component 1434 may provide the speechlet 1307 with various device identifiers of the voice-enabled devices, the determined target device, the determined intent and/or command, etc.

The speechlet 1307 and/or NLU component 166 may determine a domain based on the intent and, based on this determination, route the request corresponding to the audio data to the appropriate domain speechlet, such as the illustrated domain speechlets 170. The domain speechlet 170 may comprise any type of device or group of devices (e.g., hardware device, virtual devices or partitions, server, etc.), and may receive the text data and/or an intent associated with the audio signals and may determine how to respond to the request. For instance, the intent for a command "what's my bank account balance" may be routed to a speechlet that controls generation of directive data for sending to voice-enabled devices for outputting audio informing a user of a bank account balance.

Various types of domain speechlets 170 may be used to determine which devices to send commands to and/or to use in response to a user utterance, as well as the appropriate response and potential additional content (e.g., audio data). For example, the domain speechlets 170 may include a third party application domain speechlet 170, which may handle intents associated with banking, healthcare, gaming, productivity, etc., a music domain speechlet, which may handle intents associated with music play requests (e.g., Amazon Music, Pandora, Spotify, iHeart, etc.), and/or an information domain speechlet, which may handle requests for information associated, for example, with the status of a particular device and/or content being utilized and/or output by a particular device and/or group of devices.

After the domain speechlet 170 generates the appropriate command, which may be described herein as directive data, based on the intent of the user, and/or provides additional content, such as audio data, to be output by one of the voice-enabled devices, the domain speechlet 170 may provide this information back to the speech system 160, which in turns provides some or all of this information to a text-to-speech (TTS) engine 168. The TTS engine 168 then generates an actual audio file for outputting the second audio data determined by the domain speechlet 170. After generating the file (or "audio data"), the TTS engine 168 may provide this data back to the speech system 160.

The speech system 160 may then publish (i.e., write) some or all of this information to an event bus 1446. That is, the speech system 160 may provide information regarding the initial request (e.g., the speech, the text, the domain/intent, etc.), the response to be provided to the voice-enabled device, or any other information pertinent to the interaction between the voice-enabled device and the speech-processing system 160 to the event bus 1446.

Within the speech-processing system 160, one or more components or services may subscribe to the event bus 1446 so as to receive information regarding interactions between user devices and the speech-processing system 160. In the illustrated example, for instance, the device management component 1448 may subscribe to the event bus 1446 and, thus, may monitor information regarding these interactions. In some examples, monitoring information in the event bus 1446 may comprise messages between various components of the speech-processing system 160. For example, the targeting component 1434 may monitor the event bus 1446 to identify device state data for voice-enabled devices. In some examples, the event bus 1446 may "push" or send indications of events and/or device state data to the targeting component 1434. Additionally, or alternatively, the event bus 1446 may be "pulled" where the targeting component 1434 sends requests to the event bus 1446 to provide an indication of device state data for a voice-enabled device. The event bus 1446 may store indications of the device states for the devices, such as in a database (e.g., user registry 158), and using the stored indications of the device states, send the device state data for voice-enabled devices to the targeting component 1434. Thus, to identify device state data for a device, the targeting component 1434 may send a request to the event bus 1446 (e.g., event component) to provide an indication of the device state data associated with a device, and receive, from the event bus 1446, the device state data that was requested.

The device management component 1448 functions to monitor information published to the event bus 1446 and identify events that may trigger action. For instance, the device management component 1448 may identify (e.g., via filtering) those events that: (i) come from voice-enabled devices that are associated with secondary device(s) (e.g., have secondary devices in their environments such as televisions, personal computing devices, accessory devices, etc.), and (ii) are associated with supplemental content (e.g., image data, video data, etc.). The device management component 1448 may reference the user registry 158 to determine which voice-enabled devices are associated with secondary devices, as well as determine device types, states, and other capabilities of these secondary devices. For instance, the device management component 1448 may determine, from the information published to the event bus 1446, an identifier associated with the voice-enabled device making the corresponding request or the voice-enabled device selected to respond to or act upon the user utterance. The device management component 1448 may use this identifier to identify, from the user registry 158, a user account associated with the voice-enabled device. The device management component 1448 may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like.

The device management component 1448 may determine whether a particular event identified is associated with supplemental content. That is, the device management component 1448 may write, to a datastore, indications of which types of events and/or which primary content or responses are associated with supplemental content. In some instances, the speech-processing system 160 may provide access to third-party developers to allow the developers to register supplemental content for output on secondary devices for particular events and/or primary content. For example, if a voice-enabled device is to output that the weather will include thunder and lightning, the device management component 1448 may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device to the audio session. In these and other examples, the device management component 1448 may store an association between the primary response or content (e.g., outputting of information regarding the world's largest mammal) and corresponding supplemental content (e.g., the audio data, image data, or the like). In some instances, the device management component 1448 may also indicate which types of secondary devices are to output which supplemental content. For instance, in the instant example, the device management component 1448 may store an indication that secondary devices of a class type "tablet" are to output a picture of a blue whale. In these and other instances, meanwhile, the device management component 1448 may store the supplemental content in association with secondary-device capabilities (e.g., devices with speakers output the audio commentary, devices with screens output the image, etc.).

The device management component 1448 may also determine how to transmit response and/or supplement content (and/or information acquiring the content) to the voice-enabled devices and/or the secondary devices. To make this determination, the device management component 1448 may determine a device type of the voice-enabled devices and/or secondary devices, capabilities of the device(s), or the like, potentially as stored in the user registry 158. In some instances, the device management component 1448 may determine that a particular device is able to communicate directly with the speech-processing system 160 (e.g., over WiFi) and, thus, the device management component 1448 may provide the response and/or content directly over a network 112 to the secondary device (potentially via the speech system 160). In another example, the device management component 1448 may determine that a particular secondary device is unable to communicate directly with the speech-processing system 160, but instead is configured to communicate with a voice-enabled device in its environment over short-range wireless networks. As such, the device management component 1448 may provide the supplement content (or information) to the speech system 160, which in turn may send this to the voice-enabled device, which may send the information over a short-range network to the secondary device.

The speech-processing system 160 may further include the user registry 158 that includes data regarding user profiles as described herein. The user registry 158 may be located part of, or proximate to, the speech-processing system 160, or may otherwise be in message with various components, for example over the network 112. The user registry 158 may include a variety of information related to individual users, accounts, etc. that interact with the voice-enabled devices, and the speech-processing system 160. For illustration, the user registry 158 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 158 may store indications of associations between various voice-enabled devices and/or secondary device, such as virtual clusters of devices, states of devices, and associations between devices and audio-session queues. The user registry 158 may represent clusters of devices and/or as single devices that can receive commands and disperse the commands to each device and/or in the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the speechlet 1307 and/or the domain speechlets 170 may determine, based on the stored device states in the user registry 158, a current device state of the voice-enabled devices. Rather than receiving device states for the voice-enabled devices, in metadata, the device states may already have been determined or received and stored in the user registry 158. Further, the user registry 158 may provide indications of various permission levels depending on the user. As an example, the speech system 160 may perform speaker recognition on audio signals to determine an identity of the speaker. If the speaker is a child, for instance, the child profile may have permission restrictions where they are unable to request audio to be output via certain devices and/or to output certain audio on one or more of the devices, for example. Conversely, a parent profile may be able to direct output of audio without restrictions.

In some examples, to determine the device state, the event bus 1446 may publish different events which indicate device states to various entities or components that subscribe to the event bus 1446. For instance, if an event of "call Rob's Home" occurs for a voice-enabled device, the event bus 1446 may publish the indication of this event, and thus the device state of the voice-enabled device from which the audio data was received may be determined. Thus, various components, such as the targeting component 1434, may be provided with indications of the various device states via the event bus 1446. The event bus 1446 may further store and/or update device states for the voice-enabled devices in the user registry 158. The components of the speech-processing system 160 may query the user registry 158 to determine device states.

A particular user profile may include a variety of data that may be used by the system 160. For example, a user profile may include information about what voice-enabled devices are associated with the user and/or user profile. The user profile may further indicate an IP address for each of the devices associated with the user and/or user profile, user IDs for the devices, indications of the types of devices, and current device states for the devices.

Figure 15:
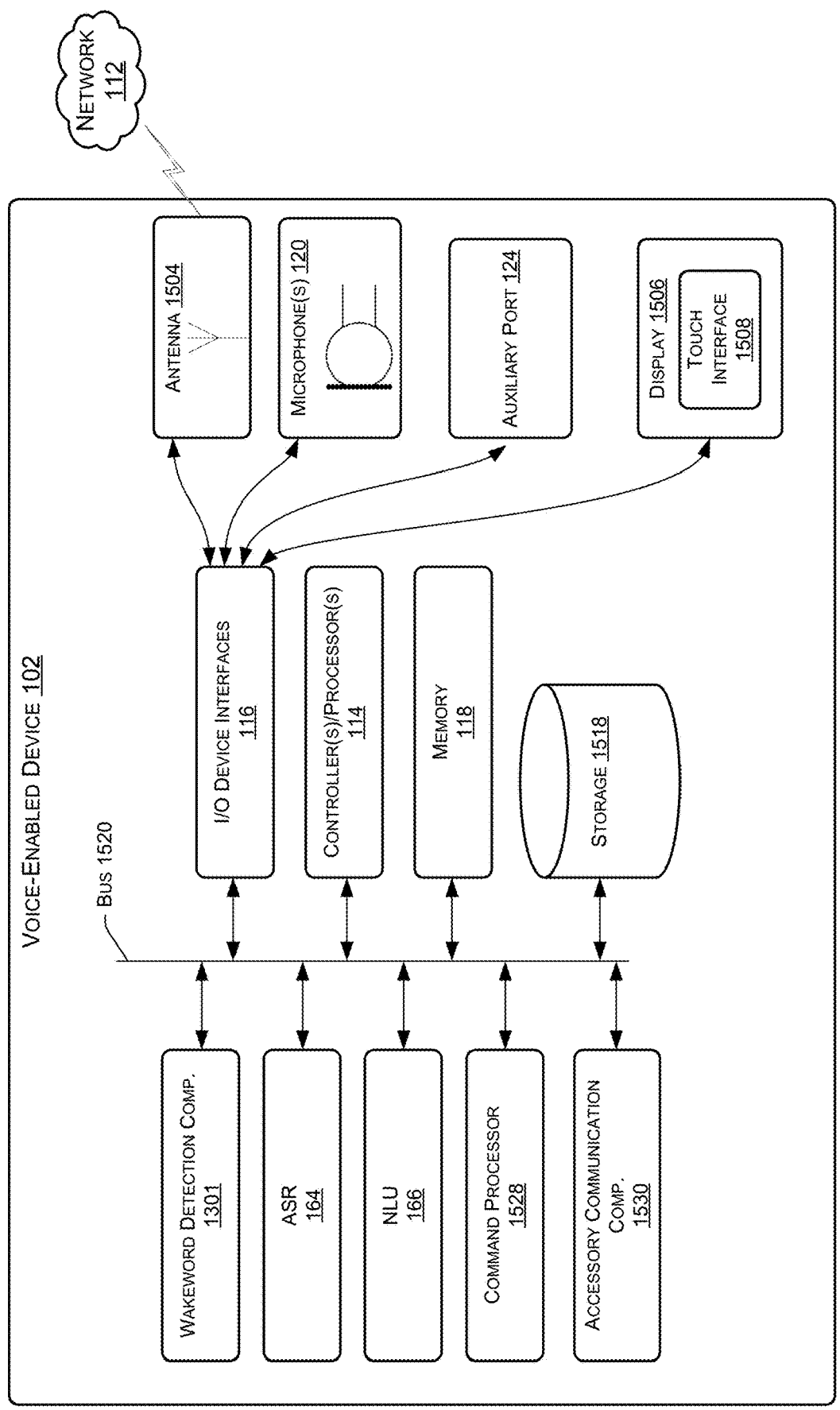
FIG. 15 illustrates a conceptual diagram of example components of a voice-enabled device.

FIG. 15 illustrates a conceptual diagram of example components of a voice-enabled device 102. The voice-enabled device 102 may be implemented as a standalone device 102 that is relatively simple in terms of functional capabilities with limited input/output components, memory, and processing capabilities. For instance, the voice-enabled device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the voice-controlled device 102. Nonetheless, the primary, and potentially only mode, of user interaction with the device 102 is through voice input and audible output. In some instances, the device 102 may simply comprise a microphone 120, a power source, and functionality for sending generated audio data via one or more antennas 1504 to another device.

The voice-enabled device 102 may also be implemented as a more sophisticated computing device, such as a computing device similar to, or the same as, a smart phone or personal digital assistant. The device 102 may include a display 1506 with a touch interface 1508 and various buttons for providing input as well as additional functionality such as the ability to send and receive communications. Alternative implementations of the voice-controlled device 102 may also include configurations as a personal computer. The personal computer may include a keyboard, a mouse, a display 1506, and other hardware or functionality that is found on a desktop, notebook, netbook, or other personal computing devices. In examples, the voice-enabled device 102 may include an automobile, such as a car, and the auxiliary device 106 may be disposed in the car and connected, via wired or wireless coupling, to the car. In other examples, the voice-enabled device 102 may include a pin on a user's clothes or a phone on a user's person, and the auxiliary device 106 may comprise an automobile, such as a car, that operates in coordination with the pin or phone, as described herein. In examples, the voice-enabled device 102 and may not include speaker(s) and may utilize speaker(s) of an external or peripheral device to output audio via the speaker(s) of the external/peripheral device, also described herein as an auxiliary device 106. In this example, the voice-enabled device 102 might represent a set-top box (STB), and the device 102 may utilize speaker(s) of an auxiliary device 106 such as a television that is connected to the STB for output of audio via the external speakers. In other examples, the voice-enabled device 102 may not include the microphone(s) 120, and instead, the voice-enabled device 102 can utilize microphone(s) of an external or peripheral device to capture audio and/or generate audio data. In this example, the voice-enabled device 102 may utilize microphone(s) of a headset that is coupled (wired or wirelessly) to the voice-enabled device 102. These types of devices are provided by way of example and are not intended to be limiting, as the techniques described in this disclosure may be used in essentially any device that has an ability to recognize speech input or other types of natural language input.

The voice-enabled device 102 of FIG. 10 may include one or more controllers/processors 114, that may include a central processing unit (CPU) for processing data and computer-readable instructions, and memory 118 for storing data and instructions of the device 102. The voice-enabled device 102 may also be connected to removable or external non-volatile memory and/or storage, such as a removable memory card, memory key drive, networked storage, etc., through input/output device interfaces 116.

Computer instructions for operating the voice-enabled device 102 and its various components may be executed by the device's controller(s)/processor(s) 114, using the memory 118 as temporary "working" storage at runtime. A device's computer instructions may be stored in a non-transitory manner in non-volatile memory 118, storage 1518, or an external device(s). Alternatively, some or all of the executable instructions may be embedded in hardware or firmware on the device 102 104 in addition to or instead of software.

The voice-enabled device 102 may include input/output device interfaces 116. A variety of components may be connected through the input/output device interfaces 116. Additionally, the voice-enabled device 102 may include an address/data bus 1520 for conveying data among components of the respective device. Each component within a device 102 may also be directly connected to other components in addition to, or instead of, being connected to other components across the bus 1520.

The device 102 may include a display 1506, which may comprise a touch interface 1508. Any suitable display technology, such as liquid crystal display (LCD), organic light emitting diode (OLED), electrophoretic, and so on, may be utilized for the displays 1506. Furthermore, the processor(s) 114 may comprise graphics processors for driving animation and video output on the associated display 1506, or the device 102 may be "headless" and may primarily rely on spoken commands for input. As a way of indicating to a user that a connection between another device has been opened, the device 102 may be configured with one or more visual indicators, such as the light elements(s), which may be in the form of LED(s) or similar components (not illustrated), that may change color, flash, or otherwise provide visible light output, such as for a notification indicator on the device 102. The input/output device interfaces 116 that connect to a variety of components such as the auxiliary port 124. This wired or a wireless audio and/or video port may allow for input/output of audio/video to/from the device 102. The device 102 may also include an audio capture component. The audio capture component may be, for example, a microphone 120 or array of microphones, a wired headset or a wireless headset, etc. The microphone 120 may be configured to capture audio. If an array of microphones is included, approximate distance to a sound's point of origin may be determined using acoustic localization based on time and amplitude differences between sounds captured by different microphones of the array. The device 102 (using microphone 120, wakeword detection component 1301, ASR component 164, etc.) may be configured to generate audio data corresponding to captured audio. The device 102 (using input/output device interfaces 116, antenna 1504, etc.) may also be configured to transmit the audio data to the remote system 110 for further processing or to process the data using internal components such as a wakeword detection component 1301.

Via the antenna(s) 1504, the input/output device interface 116 may connect to one or more networks 112 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s) 112, the speech-processing system may be distributed across a networked environment. Accordingly, the device 102 and/or the remote system 110 may include an ASR component 164. The ASR component 164 of device 102 may be of limited or extended capabilities. The ASR component 164 may include language models stored in ASR model storage component, and an ASR component 164 that performs automatic speech recognition. If limited speech recognition is included, the ASR component 164 may be configured to identify a limited number of words, such as keywords detected by the device, whereas extended speech recognition may be configured to recognize a much larger range of words.

The device 102 and/or the remote system 110 may include a limited or extended NLU component 166. The NLU component 166 of device 102 may be of limited or extended capabilities. The NLU component 166 may comprise a name entity recognition module, an intent classification module and/or other components. The NLU component 166 may also include a stored knowledge base and/or entity library, or those storages may be separately located.

The device 102 and/or the remote system 110 may also include a command processor 1528 that is configured to execute commands/functions associated with a spoken command as described herein.

The device 102 may include a wakeword detection component 1301, which may be a separate component or may be included in an ASR component 164. The wakeword detection component 1301 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method comprising:
    determining that an electronic device is operating in a first audio playback configuration able to process one or more voice commands;
    receiving, at the electronic device, input data indicating a request to transition the electronic device to a second audio playback configuration;
    receiving, at the electronic device and while the electronic device is operating in the second audio playback configuration, first audio data representing a voice command; and
    based at least in part on the electronic device operating in the second audio playback configuration, refraining from sending the audio data to a remote speech processing system.

2. The method of claim 1, further comprising transitioning the electronic device from the first audio playback configuration to the second audio playback configuration based at least in part on the input data.

3. The method of claim 1, wherein:
    the first audio playback configuration is associated with the electronic device having WiFi connectivity; and
    the second audio playback configuration is associated with the electronic device having Bluetooth connectivity.

4. The method of claim 1, further comprising:
    receiving, at the electronic device and while the electronic device is operating in the first audio playback configuration, second audio data representing the voice command; and
    based at least in part on the electronic device operating in the first audio playback configuration, sending the second audio data to the remote speech processing system.

5. The method of claim 1, further comprising:
    transitioning the electronic device from the second audio playback configuration to the first audio playback configuration based at least in part on receiving second audio data; and
    based at least in part on the electronic device operating in the first audio playback configuration, sending the second audio data to the remote speech processing system.

6. The method of claim 1, further comprising outputting, by the electronic device and based at least in part on receiving the first audio data, audio including a recommendation to transition the electronic device to the first audio playback configuration.

7. The method of claim 1, wherein the first audio playback configuration is associated with the electronic device having WiFi connectivity, and the method further comprises:
    determining that the electronic device lost WiFi connectivity while operating in the first audio playback configuration; and
    transitioning the electronic device to the second audio playback configuration based at least in part on determining that the electronic device lost WiFi connectivity.

8. An electronic device comprising:
    one or more processors; and
    one or more computer-readable media storing instructions that, when executed by the one or more processors, cause the one or more processors to perform operations comprising:
        determining that the electronic device is operating in a first audio playback configuration able to process voice commands;
        receiving input data to transition the electronic device to a second audio playback configuration;

receiving first audio representing a voice command while the electronic device is operating in the second audio playback configuration; and based at least in part on the electronic device operating in the second audio playback configuration, refraining from processing first audio data corresponding to the first audio.

9. The electronic device of claim 8, the operations further comprising transitioning the electronic device to the second audio playback configuration based at least in part on the input data, wherein transitioning the electronic device comprises establishing a local network connection with the electronic device.

10. The electronic device of claim 8, wherein:
the first audio playback configuration is associated with the electronic device having WiFi connectivity; and
the second audio playback configuration is associated with the electronic device having Bluetooth connectivity.

11. The electronic device of claim 8, the operations further comprising:
receiving, while the electronic device is operating in the first audio playback configuration, the first audio; and
based at least in part on the electronic device operating in the first audio playback configuration, sending the first audio data to a remote speech processing system.

12. The electronic device of claim 8, the operations further comprising:
transitioning the electronic device to the first audio playback configuration based at least in part on receiving second audio; and
based at least in part on determining that the electronic device is operating in the first audio playback configuration, processing second audio data corresponding to the second audio.

13. The electronic device of claim 8, the operations further comprising outputting, based at least in part on receiving the first audio, second audio including a recommendation to transition the electronic device to the first audio playback configuration.

14. The electronic device of claim 8, wherein the first audio playback configuration is associated with the electronic device having WiFi connectivity, and the operations further comprise:

determining that the electronic device lost WiFi connectivity while operating in the first audio playback configuration; and
transitioning the electronic device to the second audio playback configuration based at least in part on the electronic device losing WiFi connectivity.

15. A method comprising:
determining that an electronic device is operating in a first audio playback configuration indicating the electronic device is to refrain from processing audio data;
receiving input data to transition the electronic device to a second audio playback configuration;
receiving first audio representing a voice command while the electronic device is operating in the second audio playback configuration; and
based at least in part on the electronic device operating in the second audio playback configuration, processing first audio data corresponding to the first audio.

16. The method of claim 15, further comprising transitioning the electronic device to the second audio playback configuration based at least in part on the input data, wherein transitioning the electronic device comprises establishing a WiFi connection with the electronic device.

17. The method of claim 15, wherein:
the first audio playback configuration is associated with the electronic device having Bluetooth connectivity; and
the second audio playback configuration is associated with the electronic device having WiFi connectivity.

18. The method of claim 15, further comprising:
receiving, while the electronic device is operating in the first audio playback configuration, the first audio; and
transitioning the electronic device to the second audio playback configuration based at least in part on receiving the first audio.

19. The method of claim 18, further comprising sending the first audio data representing the voice command to a remote speech processing system while the electronic device is operating in the second audio playback configuration.

20. The method of claim 15, wherein processing the audio data comprises detecting a wake word from the first audio data.

* * * * *